(12) United States Patent
Wu et al.

(10) Patent No.: US 11,587,541 B2
(45) Date of Patent: Feb. 21, 2023

(54) PROVIDING PERSONALIZED SONGS IN AUTOMATED CHATTING

(71) Applicant: MICROSOFT TECHNOLOGY LICENSING, LLC, Redmond, WA (US)

(72) Inventors: Xianchao Wu, Redmond, WA (US); Kazushige Ito, Redmond, WA (US); Kazuna Tsuboi, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 481 days.

(21) Appl. No.: 16/625,624

(22) PCT Filed: Jun. 21, 2017

(86) PCT No.: PCT/CN2017/089344
§ 371 (c)(1),
(2) Date: Dec. 20, 2019

(87) PCT Pub. No.: WO2018/232623
PCT Pub. Date: Dec. 27, 2018

(65) Prior Publication Data
US 2021/0158789 A1    May 27, 2021

(51) Int. Cl.
*G06F 40/35* (2020.01)
*G10H 1/00* (2006.01)
(Continued)

(52) U.S. Cl.
CPC .......... *G10H 1/0025* (2013.01); *G06F 40/216* (2020.01); *G06F 40/35* (2020.01);
(Continued)

(58) Field of Classification Search
CPC .......... G10H 1/0025; G10H 1/26; G10H 1/00; G10H 2210/131; G10H 2220/011;
(Continued)

(56) References Cited

U.S. PATENT DOCUMENTS

| 9,401,941 | B2 | 7/2016 | Juristovski et al. |
| 2011/0054902 | A1* | 3/2011 | Li ......................... G10L 13/033 704/258 |

(Continued)

FOREIGN PATENT DOCUMENTS

| CN | 1988461 A | 6/2007 |
| CN | 102014081 A | 4/2011 |

(Continued)

OTHER PUBLICATIONS

International Search Report and Written Opinion for PCT/CN2017/089344, dated Mar. 20, 2018.

(Continued)

*Primary Examiner* — Huyen X Vo
(74) *Attorney, Agent, or Firm* — Workman Nydegger

(57) ABSTRACT

The present disclosure provides method and apparatus for providing personalized songs in automated chatting. A message may be received in a chat flow. Personalized lyrics of a user may be generated based at least on a personal language model of the user in response to the message. A personalized song may be generated based on the personalized lyrics. The personalized song may be provided in the chat flow.

20 Claims, 13 Drawing Sheets

(51) Int. Cl.
*G06F 40/216* (2020.01)
*G06F 40/44* (2020.01)
*G06N 3/04* (2023.01)

(52) U.S. Cl.
CPC ............ *G06F 40/44* (2020.01); *G06N 3/0427* (2013.01); *G06N 3/0472* (2013.01); *G10H 2210/131* (2013.01); *G10H 2220/011* (2013.01); *G10H 2240/141* (2013.01); *G10H 2250/311* (2013.01)

(58) Field of Classification Search
CPC ....... G10H 2240/141; G10H 2250/311; G10H 1/361; G10H 1/36; G10H 2240/085; G06F 40/216; G06F 40/35; G06F 40/44; G06F 40/56; G06N 3/0427; G06N 3/04; G06N 3/0472; G06N 3/02; G06N 5/003; G06N 5/00; G06N 20/20; G06N 3/0445; G06N 3/0454; G06N 3/08
See application file for complete search history.

(56) References Cited

U.S. PATENT DOCUMENTS

| | | | | |
|---|---|---|---|---|
| 2013/0006627 | A1* | 1/2013 | Guthery | H04L 51/04 704/235 |
| 2016/0086620 | A1 | 3/2016 | Ostermann et al. | |
| 2017/0057648 | A1 | 3/2017 | Evulet | |
| 2018/0190249 | A1* | 7/2018 | Roblek | G06N 3/084 |
| 2018/0190270 | A1* | 7/2018 | Chen | G10L 15/1815 |
| 2018/0196796 | A1* | 7/2018 | Wu | G06N 5/022 |

FOREIGN PATENT DOCUMENTS

| | | | | |
|---|---|---|---|---|
| CN | 102053998 | A | 5/2011 | |
| CN | 104391980 | A * | 3/2015 | G06F 16/61 |
| CN | 104391980 | A | 3/2015 | |
| CN | 104994013 | A | 10/2015 | |
| CN | 105425953 | A | 3/2016 | |
| CN | 105955964 | A | 9/2016 | |
| CN | 105975622 | A | 9/2016 | |
| CN | 106407370 | A | 2/2017 | |
| CN | 106547789 | A | 3/2017 | |
| WO | 2007134402 | A1 | 11/2007 | |
| WO | 2015195394 | A1 | 12/2015 | |

OTHER PUBLICATIONS

Dredge, Stuart, "Unofficial Justin Bieber chatbot Reaches 3m Messages in a Week", Retrieved From: https://web.archive.org/web/20200424104627/https://musically.com/2016/10/06/justin-bieber-chatbot/, Oct. 6, 2016, 2 Pages.

Grant, Megan, "Bot-ston Gaston Twitter Bot Generates New Lyrics to the 'Beauty and the Beast' Song, Because Nobody Tweets Like Gaston", Retrieved From: https://www.bustle.com/articles/156098-bot-ston-gaston-twitter-bot-generates-new-lyrics-to-the-beauty-and-the-beast-song-because-nobody, Apr. 21, 2016, 4 Pages.

Malmi, et al., "DopeLearning: A Computational Approach to Rap Lyrics Generation", In Journal of the Computing Research Repository, May 18, 2015, 11 Pages.

Malmi, et al., "RAP Lyrics Generating AI", Retrieved From: http://deepbeat.org/, Retrieved Date: May 16, 2017, 4 Pages.

Potash, et al., "Evaluating Creative Language Generation: The Case of Rap Lyric Ghostwriting", In Journal of the Computing Research Repository, Dec. 9, 2016, 10 Pages.

"AutoRap by Smule", Retrieved From: https://web.archive.org/web/20150703154526/https://itunes.apple.com/za/app/autorap-by-smule/id524299475?mt=8, Jul. 3, 2015, 2 Pages.

"First Office Action and Search Report Issued in Chinese Patent Application No. 201780057465.2", dated Nov. 30, 2022, 15 Pages.

* cited by examiner

PROVIDING PERSONALIZED SONGS IN AUTOMATED CHATTING

This application is a U.S. National Stage Application of PCT/CN2017/089344, filed Jun. 21, 2017, which application is hereby incorporated by reference. To the extent appropriate, a claim of priority is made to the above disclosed application.

BACKGROUND

Artificial Intelligence (AI) chatbot is becoming more and more popular, and is being applied in an increasing number of scenarios. The chatbot is designed to simulate people's conversation, and may chat with users by text, speech, image, etc. Generally, the chatbot may scan for keywords within a message input by a user or apply natural language processing on the message, and provide a response with the most matching keywords or the most similar wording pattern to the user.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for providing personalized songs in automated chatting. A message may be received in a chat flow. Personalized lyrics of a user may be generated based at least on a personal language model of the user in response to the message. A personalized song may be generated based on the personalized lyrics. The personalized song may be provided in the chat flow.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
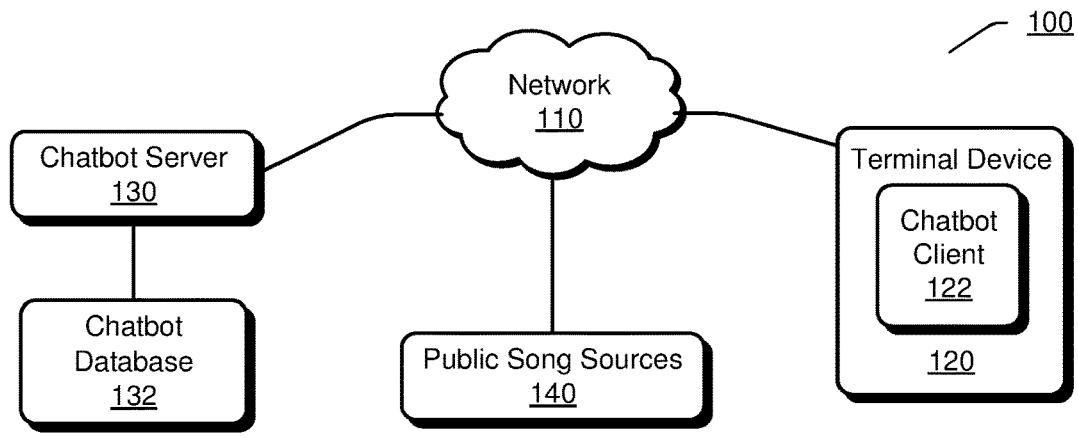
FIG. 1 illustrates an exemplary application scenario of a chatbot according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

A chatbot may be applied in various scenarios. Embodiments of the present disclosure propose to use a chatbot to provide song-related services to users.

According to an embodiment, the chatbot may generate a user's personalized song in response to a public song indicated by the user. In an implementation, the user's personalized lyrics of the personalized song may be generated through mapping sentences in the public song's lyrics to the user's personalized sentences. During generating the personalized lyrics, at least one of a personal language model of the user, a public song language model and a topic-emotion graph may be used. Herein, "personal language model" may refer to a language model that characterizes the user's language style or habits and is established based on the user's historical words or sentences in sessions with the chatbot, wherein "session" may refer to a time-continuous dialog between two chatting participants and may include messages and responses in the dialog. "Public song language model" may refer to a language model that characterizes language expressions of lyrics of public songs and is established based on lyrics of one or more public songs. Moreover, "topic-emotion graph" may refer to a knowledge graph which represents topic-to-topic mapping relationship, topic-to-emotion mapping relationship, and emotion-to-topic mapping relationship among a number of words and is established with a plurality of topic words and a plurality of emotion words, wherein the topic words may refer to words that indicate various topics and the emotion words may refer to words that indicate various emotions. The "topic-emotion graph" may also be referred to as "emotion-oriented topic graph". It should be appreciated that, in this disclosure, the term "word" may be interchangeable with the term "phrase", e.g., "a word" may be a single word or a combination of several words, and "a phrase" may comprise a single word or a combination of several words. In an implementation, the user's voices or an original singer's voices for the personalized lyrics may be generated, and the public song's tune may be applied on the user's voices or the original singer's voices to generate the personalized song.

According to an embodiment, the chatbot may generate a user's personalized song in response to at least one keyword input by the user or automatically retrieved by the chatbot. In an implementation, the user's personalized lyrics of the personalized song may be generated through mapping the at least one keyword to the user's personalized sentences. During generating the personalized lyrics, at least one of a personal language model of the user, a public song language model and a topic-emotion graph may be used. In an implementation, a tune for the personalized song may be generated based on the personalized lyrics. In an implementation, the user's voices for the personalized lyrics may be generated, and the personalized song's tune may be applied on the user's voices to generate the personalized song.

According to an embodiment, the chatbot may assess the user's sing of a target song. In an implementation, the assessment may be performed based on a comparison between a spectrogram when the user is singing and a spectrogram when an original singer is singing.

According to an embodiment, the chatbot may retrieve a target song in response to a query from the user in text or voice. In an implementation, a similarity matching model may be used for retrieving the target song based on the query.

FIG. 1 illustrates an exemplary application scenario 100 of a chatbot according to an embodiment.

In FIG. 1, a network 110 is applied for interconnecting among a terminal device 120, a chatbot server 130, and public song sources 140.

The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of electronic computing devices capable of connecting to the network 110, assessing servers or websites on the network 110, processing data or signals, etc. For example, the terminal device 120 may be desktop computers, laptops, tablets, smart phones, etc. Although only one terminal device is shown in FIG. 1, it should be appreciated that a different number of terminal devices may connect to the network 110.

In an implementation, the terminal device 120 may be used by a user. The terminal device 120 may include a chatbot client 122 which may provide automated chatting service for the user. In some cases, the chatbot client 122 may interact with the chatbot server 130. For example, the chatbot client 122 may transmit messages input by the user to the chatbot server 130, and receive responses associated with the messages from the chatbot server 130. However, it should be appreciated that, in other cases, instead of interacting with the chatbot server 130, the chatbot client 122 may also locally generate responses to messages input by the user. Herein, "messages" may refer to any input information, e.g., queries from the user, answers of the user to questions from the chatbot, etc.

The chatbot server 130 may connect to or incorporate a chatbot database 132. The chatbot database 132 may comprise information that can be used by the chatbot server 130 for generating responses.

The public song sources 140 may refer to various music or song websites that provide audio files of public songs, lyrics of the public songs, etc.

It should be appreciated that all the network entities shown in FIG. 1 are exemplary, and depending on specific application requirements, any other network entities may be involved in the application scenario 100.

Figure 2:
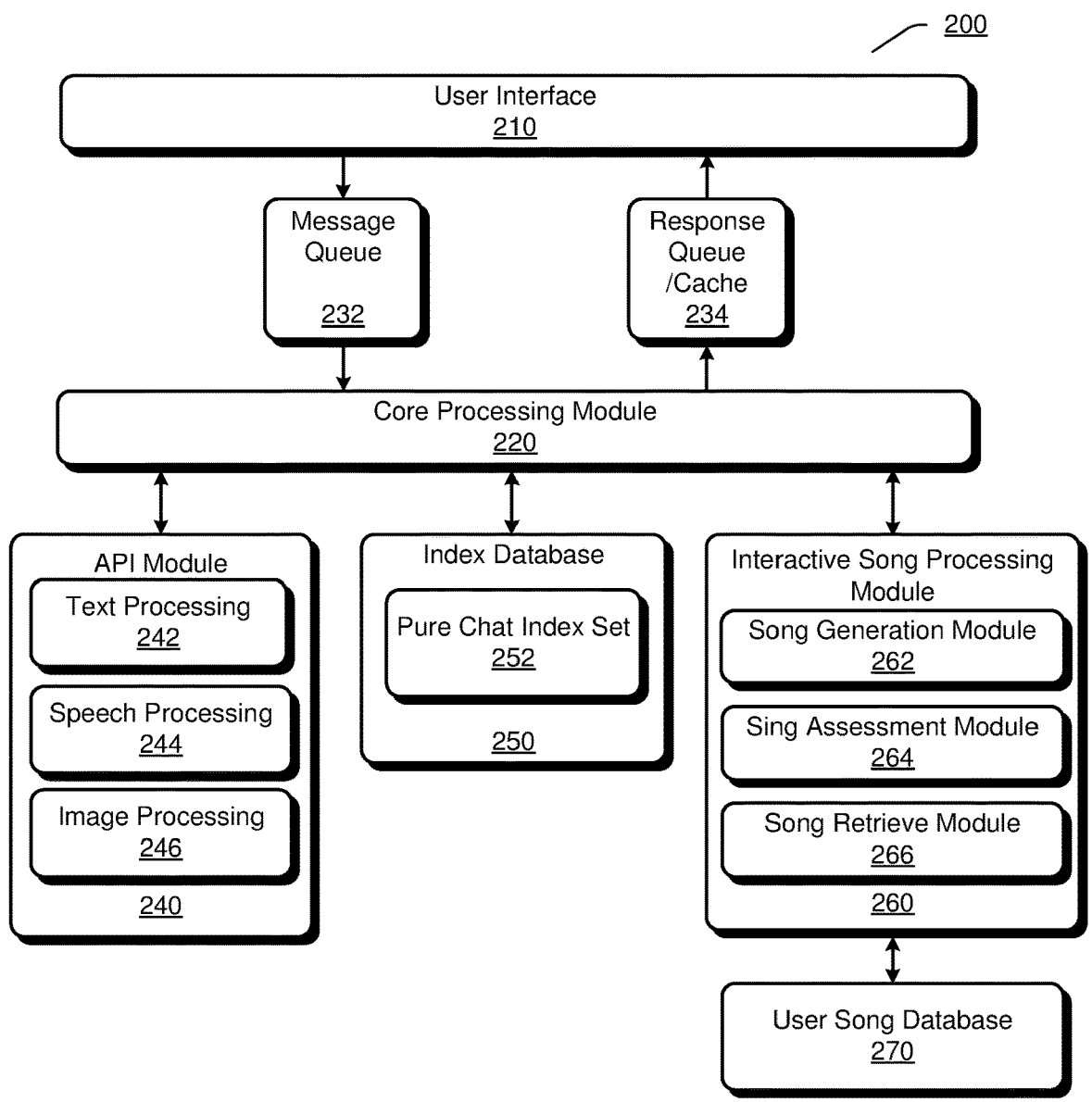
FIG. 2 illustrates an exemplary chatbot system according to an embodiment.

FIG. 2 illustrates an exemplary chatbot system 200 according to an embodiment.

The chatbot system 200 may comprise a user interface (UI) 210 for presenting a chat window. The chat window may be used by the chatbot for interacting with a user.

The chatbot system 200 may comprise a core processing module 220. The core processing module 220 is configured for, during operation of the chatbot, providing processing capabilities through cooperation with other modules of the chatbot system 200.

The core processing module 220 may obtain messages input by the user in the chat window, and store the messages in the message queue 232. The messages may be in various multimedia forms, such as, text, speech, image, video, etc.

The core processing module 220 may process the messages in the message queue 232 in a first-in-first-out manner. The core processing module 220 may invoke processing units in an application program interface (API) module 240 for processing various forms of messages. The API module 240 may comprise a text processing unit 242, a speech processing unit 244, an image processing unit 246, etc.

For a text message, the text processing unit 242 may perform text understanding on the text message, and the core processing module 220 may further determine a text response.

For a speech message, the speech processing unit 244 may perform a speech-to-text conversion on the speech message to obtain text sentences, the text processing unit 242 may perform text understanding on the obtained text sentences, and the core processing module 220 may further determine a text response. If it is determined to provide a response in speech, the speech processing unit 244 may perform a text-to-speech conversion on the text response to generate a corresponding speech response.

For an image message, the image processing unit 246 may perform image recognition on the image message to generate corresponding texts, and the core processing module 220 may further determine a text response. In some cases, the image processing unit 246 may also be used for obtaining an image response based on the text response.

Moreover, although not shown in FIG. 2, the API module 240 may also comprise any other processing units. For example, the API module 240 may comprise a video processing unit for cooperating with the core processing module 220 to process a video message and determine a response.

The core processing module 220 may determine responses through an index database 250. The index database 250 may comprise a plurality of index items that can be retrieved by the core processing module 220 as responses. The index items in the index database 250 may be classified into a pure chat index set 252. The pure chat index set 252 may comprise index items that are prepared for free chatting between the chatbot and users, and may be established with data from, e.g., social networks. The index items in the pure chat index set 252 may or may not be in a form of question-answer (QA) pair. Question-answer pair may also be referred to as message-response pair.

The chatbot system 200 may comprise an interactive song processing module 260 and the core processing module 220 may generate responses based on outputs from the interactive song processing module 260. The interactive song processing module 260 may be used for facilitating to provide song-related services. The interactive song processing module 260 may comprise a song generation module 262, a sing assessment module 264, and a song retrieve module 266. The song generation module 262 may be configured for generating personalized songs based on a public song or at least one keyword according to the embodiments of the present disclosure. The sing assessment module 264 may be configured for assessing a user's sing of a target song according to the embodiments of the present disclosure. The song retrieve module 266 may be configured for retrieving a target song in response to a query from a user according to the embodiments of the present disclosure.

The interactive song processing module 260 may connect to a user song database 270 that maintains personalized songs. The user song database 270 may be implemented as a user-specific song database which maintains all personalized songs generated for a specific user, and/or implemented as an all-user song database which maintains all personalized songs generated for all users of the chatbot. The interactive song processing module 260 may store generated personalized songs in the user song database 270 and may retrieve a personalized song from the user song database 270.

The responses determined by the core processing module 220 may be provided to a response queue or response cache 234. For example, the response cache 234 may ensure that a sequence of responses can be displayed in a pre-defined time stream. Assuming that, for a message, there are no less than two responses determined by the core processing module 220, then a time-delay setting for the responses may be necessary. For example, if a message input by the user is "Did you eat your breakfast?", two responses may be determined, such as, a first response "Yes, I ate bread" and a second response "How about you? Still feeling hungry?". In this case, through the response cache 234, the chatbot may ensure that the first response is provided to the user immediately. Further, the chatbot may ensure that the second response is provided in a time delay, such as 1 or 2 seconds, so that the second response will be provided to the user 1 or 2 seconds after the first response. As such, the response cache 234 may manage the to-be-sent responses and appropriate timing for each response.

The responses in the response queue or response cache 234 may be further transferred to the UI 210 such that the responses can be displayed to the user in the chat window.

It should be appreciated that all the elements shown in the chatbot system 200 in FIG. 2 are exemplary, and depending on specific application requirements, any shown elements may be omitted and any other elements may be involved in the chatbot system 200.

Figure 3:
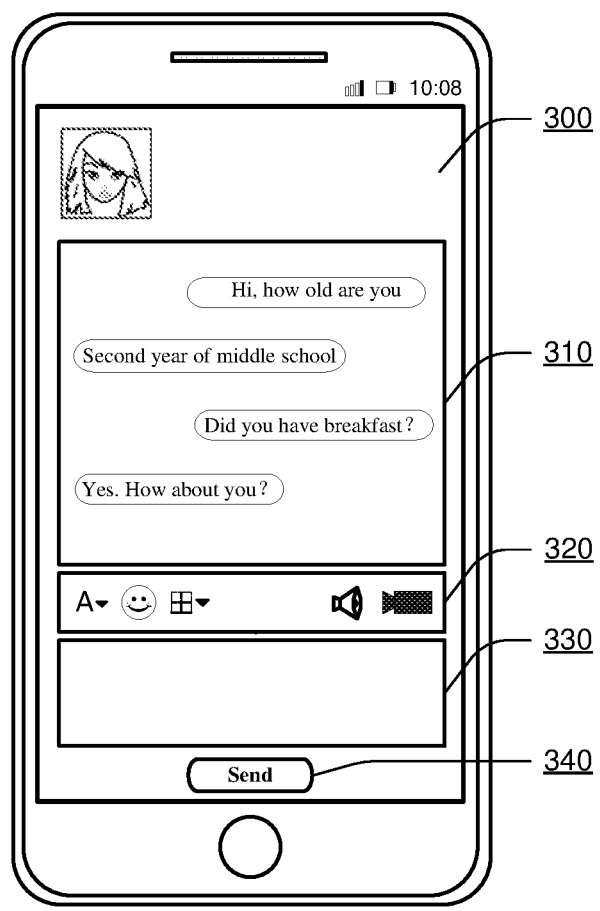
FIG. 3 illustrates an exemplary user interface according to an embodiment.

FIG. 3 illustrates an exemplary user interface 300 according to an embodiment.

The user interface 300 is included in a terminal device, and may comprise a presentation area 310, a control area 320 and an input area 330. The presentation area 310 displays messages and responses in a chat flow. The control area 320 includes a plurality of virtual buttons for the user to perform message input settings. For example, the user may select to make a voice input, attach image files, select emoji symbols, make a short-cut of the current screen, etc. through the control area 320. The input area 330 is used by the user for inputting messages. For example, the user may type text through the input area 330. The user interface 300 may further comprise a virtual button 340 for confirming to send input messages. If the user touches the virtual button 340, the messages input in the input area 330 may be sent to the presentation area 310.

It should be noted that all the elements and their layout shown in FIG. 3 are exemplary. Depending on specific application requirements, the user interface in FIG. 3 may omit or add any elements, and the layout of the elements in the user interface in FIG. 3 may also be changed in various approaches.

Figure 4:
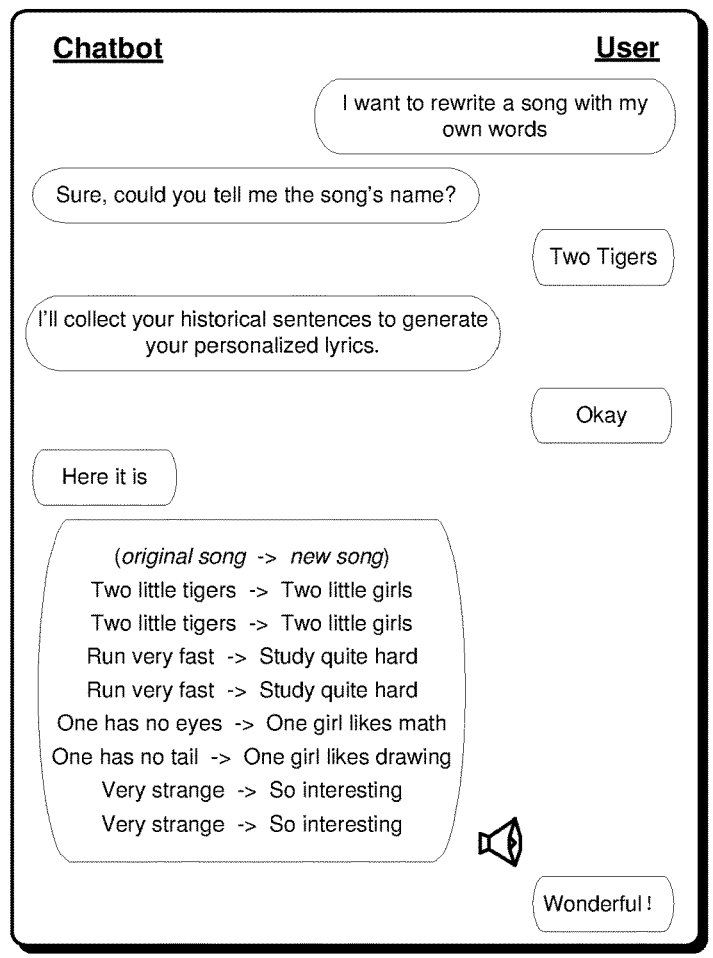
FIG. 4 illustrates an exemplary chat window according to an embodiment.

FIG. 4 illustrates an exemplary chat window 400 according to an embodiment. The chat window 400 shows an exemplary chat flow in which a chatbot may provide a personalized song based on a public song.

When a user inputs a message "I want to rewrite a song with my own words" to indicate that the user wants to obtain a personalized song based on a public song, the chatbot may respond by asking "could you tell me the song's name?". Then the user may input the name of the public song, e.g., "Two Tigers". The chatbot may inform the user that historical sentences of the user will be collected for generating a personalized song. After generating the personalized song, the chatbot may present lyrics of the public song and the user's personalized lyrics of the personalized song together. Meanwhile, a loudspeaker icon is presented in the chat window, which may be clicked by the user to display the personalized song.

It should be appreciated that the chat window 400 is exemplary, and the embodiments of the present disclosure are not limited to provide personalized songs through the chat flow shown in FIG. 4.

Figure 5:
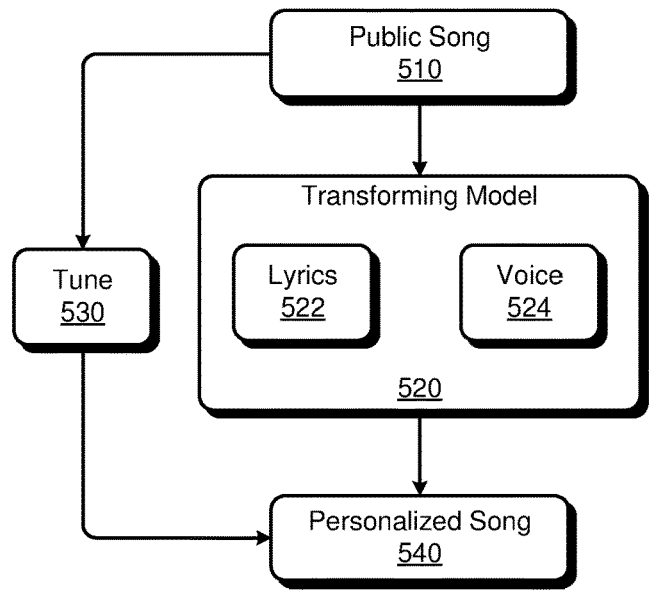
FIG. 5 illustrates an exemplary process for providing a personalized song according to an embodiment.

FIG. 5 illustrates an exemplary process 500 for providing a personalized song according to an embodiment. The process 500 may generate a personalized song based on a public song.

At 510, a public song may be determined, for which a personalized song will be generated. For example, the chatbot may determine the public song from a message input by the user. In an implementation, the user may input the public song's name directly. In an implementation, the user may input description information of the public song, e.g., the type of the public song, the theme of the public song, a segment of lyrics of the public song, etc., and the chatbot may determine the public song based on the description information.

At 520, a transforming model may be used for processing the public song. Herein, "transforming model" is a logical collection of one or more functions that facilitate to generate the personalized song.

The transforming model may comprise a personalized lyrics generation model 522. The personalized lyrics generation model 522 may be configured for generating the user's personalized lyrics from lyrics of the public song. For example, sentences in the public song's lyrics may be mapped to the user's personalized sentences so as to generate the personalized lyrics. In an implementation, a neural machine translation architecture with attention mechanism may be adopted by the personalized lyrics generation model 522. During generating the personalized lyrics, at least one of a personal language model of the user, a public song language model and a topic-emotion graph may be used, which will be discussed later.

The transforming model may comprise a voice generation model 524. In an implementation, the voice generation model 524 may generate the user's own voices for the personalized lyrics. For example, a text-to-speech (TTS) model may be adopted by the voice generation model 524. The TTS model may be established for capturing mapping between emotion words or important words in the user's personalized texts and the user's corresponding voices. A plurality of emotion words or important words may be detected in the user's personalized texts, and then the user may be required to read the texts. The texts and the user's voices when reading the texts may be taken as training data for the TTS model. During applying the TTS model, the user's personalized lyrics may be input, and the user's voices for the personalized lyrics may be output. In another implementation, the voice generation model 524 may generate voices of an original singer of the public song for the personalized lyrics. A TTS model may be trained based on lyrics of one or more songs of the singer and the singer's corresponding voices. Thus, the trained TTS model may output voices of the singer based on the personalized lyrics.

At 530, a tune of the public song may be extracted. Herein, "tune" may also be referred to as "melody", "music score", "rhyme", etc.

At 540, the personalized song may be formed through applying the public song's tune on the user's voices or the original singer's voices output by the voice generation model 524. The personalized song may follow the public song's tune, but is based on the personalized lyrics. Moreover, the personalized song may be sound like the user or the original singer is singing.

The personalized song may be kept by the user for the user's own enjoyment, or be shared by the user with friends through social networks. Moreover, the personalized song may be stored in a user-specific song database which maintains all personalized songs generated for the specific user, and/or stored in an all-user song database which maintains all personalized songs generated for all users of the chatbot.

Figure 6:
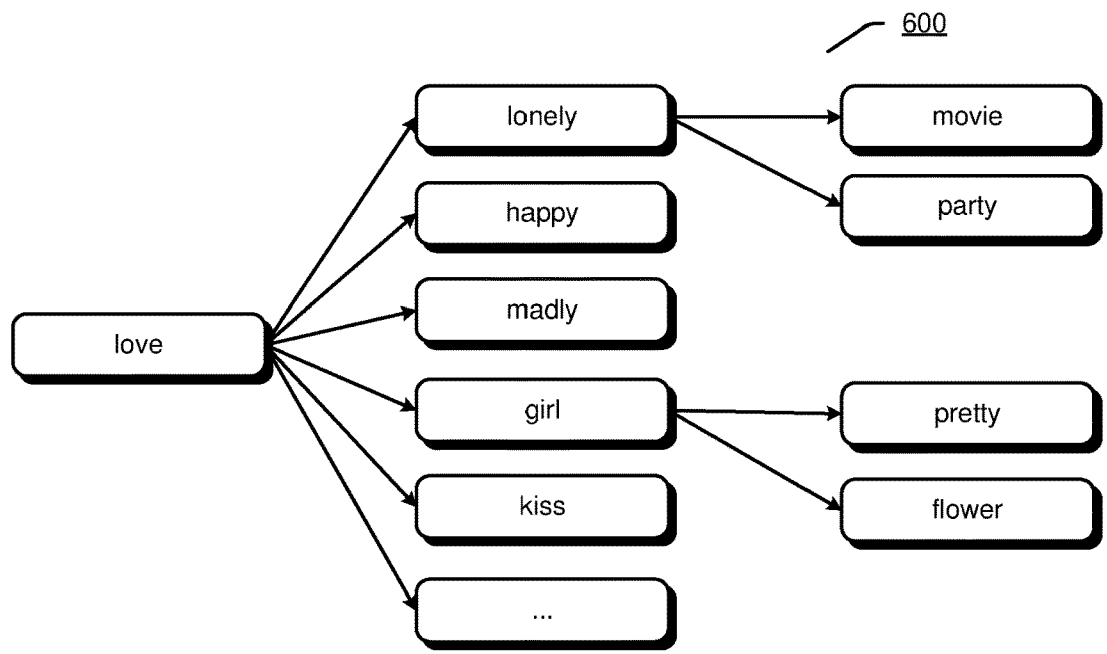
FIG. 6 illustrates an exemplary topic-emotion graph according to an embodiment.

FIG. 6 illustrates an exemplary topic-emotion graph 600 according to an embodiment. As mentioned above, a topic-emotion graph may comprise a number of words that have topic-to-topic mapping relationship, topic-to-emotion mapping relationship, or emotion-to-topic mapping relationship among each other. The topic-emotion graph may intend to extend from a topic or emotion to related topics and emotions, extend from the related topics to further topics and emotions, extend from the related emotions to further topics and emotions, and so on.

The topic-emotion graph 600 is established through extension from a topic word "love". For example, as for the topic "love", there may be various related emotions, e.g., "lonely", "happy", "madly", and there may be various related topics, e.g., "girl", "kiss", etc. Taking the emotion word "lonely" as an example, there may be various related topics, e.g., "movie", "party", etc. For example, if a person knows nobody in a "party" or less people talks with him in the "party", the person may feel "lonely", and thus there is a mapping relationship between "lonely" and "party". Moreover, taking the topic word "girl" as an example, there may be various related emotions or topics, e.g., "pretty", "flower", etc.

Figure 7:
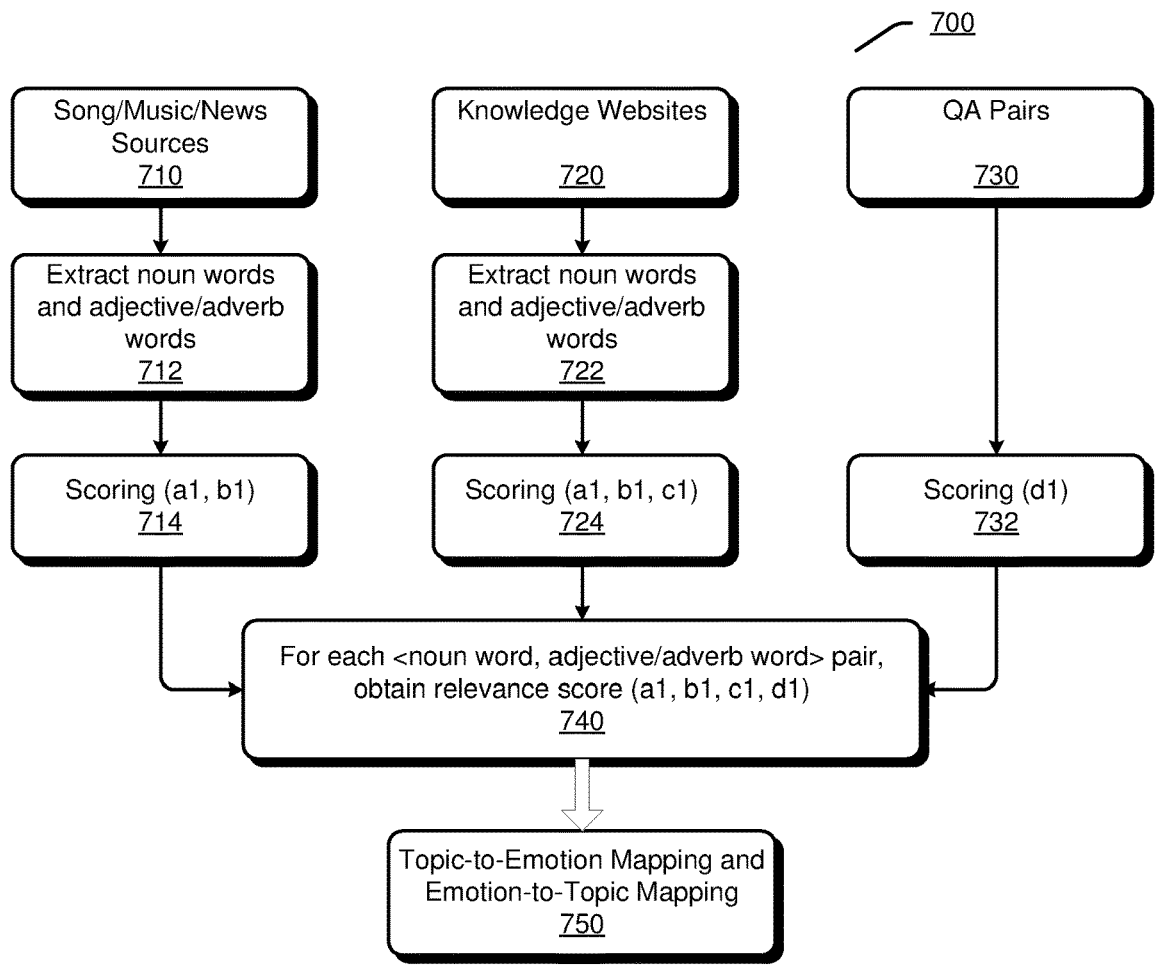
FIG. 7 illustrates an exemplary process for establishing a topic-emotion graph according to an embodiment.

FIG. 7 illustrates an exemplary process 700 for establishing a topic-emotion graph according to an embodiment. The process 700 may be used for determining word pairs that have topic-to-emotion mappings or emotion-to-topic mappings in the topic-emotion graph. Topic-to-emotion mappings and emotion-to-topic mappings may be established from various sources through data mining. Usually, a word pair having a topic-to-emotion mapping or emotion-to-topic mapping may comprise a noun word and an adjective or adverb word.

In an implementation, the data mining may be performed on song, music or news sources 710. The song, music or news sources 710 may comprise websites or channels that provide contents about song, music or news.

At 712, noun words, adjective words and adverb words may be extracted from sentences in contents provided by the song, music or news sources 710.

Figure 8:
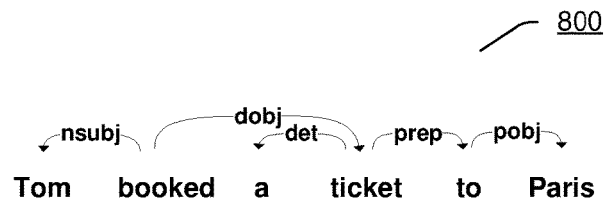
FIG. 8 illustrates an exemplary dependency parsing according to an embodiment.

At 714, word pairs formed by the noun words and the adjective/adverb words, e.g., <noun word, adjective/adverb word> pairs, may be scored based on dependency parsing. FIG. 8 illustrates an exemplary dependency parsing 800 on an exemplary sentence according to an embodiment. Assuming that a sentence "Tom booked a ticket to Paris" is inputted to the dependency parsing. The word "booked" is determined as a predicate of the sentence. A dependency arc from "booked" to "Tom" is determined, and the dependency role between "Tom" and "booked" is determined as "nsubj", where "nsubj" denotes nominal subject. A dependency arc from "booked" to "ticket" is determined, and the dependency role between "ticket" and "booked" is determined as "dobj", where "dobj" denotes direct subject. A dependency arc from "ticket" to "a" is determined, and the dependency role between "a" and "ticket" is determined as "det", where "det" denotes determiner. A dependency arc from "ticket" to "to" is determined, and the dependency role between "to" and "ticket" is determined as "prep", where "prep" denotes preposition. A dependency arc from "to" to "Paris" is determined, and the dependency role between "Paris" and "to" is determined as "pobj", where "pobj" denotes object of preposition. It should be appreciated that the dependency arcs and dependency roles shown in FIG. 8 are exemplary, and for other sentences, various dependency arcs and dependency roles may be determined through the dependency parsing.

Through the dependency parsing, dependency arcs and dependency roles among words of a sentence may be obtained. A word pair may be scored "a1" if there is a dependency arc between two words in the word pair, while the word pair may be scored "b1" if the two words in the word pair only appear in the same sentence, but there is no dependency arc between these two words.

In an implementation, the data mining may be performed on knowledge websites 720 on the network, e.g., Wikipedia. Usually, the knowledge websites 720 may present information in a form of Title and Content. An exemplary page in the knowledge websites 720 may be: "Title=Japanese foods", and "Content=Natto has a powerful smell".

At 722, noun words, adjective words and adverb words may be extracted from pages in the knowledge websites 720. For example, as for the above exemplary page, the noun words "Japanese foods", "Natto", "smell", and the adjective word "powerful" may be extracted.

At 724, word pairs formed by the noun words and the adjective/adverb words may be scored. In an implementation, all word pairs formed by noun words in the Title and adjective/adverb words in the Content may be scored "c1". For example, the word pair <Japanese foods, powerful> may be scored "c1". Moreover, the scoring mechanism of "a1" and "b1" at 714 may also be applied at 724. For example, the word pair <smell, powerful> may be scored "a1", the word pair <Natto, powerful> may be scored "b1", etc.

In an implementation, the data mining may be performed on question-answer (QA) pairs 730 that may be from QA-style websites, or from a pure chat index set used by the chatbot for free chatting.

At 732, for each QA pair, word alignment scores "d1" may be computed for word pairs formed by noun words in a question of the QA pair and adjective/adverb words in an answer of the QA pair, or formed by adjective/adverb words in a question of the QA pair and noun words in an answer of the QA pair. The major idea of the computing of word alignment scores is to determine co-occurrence frequency of two words in sentence pairs in the whole corpus. Furthermore, if it is already known that two words should be aligned with each other in a sentence pair, either of these two words should not be aligned with any other words in the sentence pair, thus strengthening scores of related words and weakening scores of non-related words. In an implementation, IBM models 1-5 may be adopted at 732 for computing the word alignment scores.

It should be appreciated that although the word alignment scoring at 732 is discussed above as being performed on QA pairs, this word alignment scoring may also be performed in a similar way on sentence pairs, e.g., <current sentence, next sentence>, in a document.

At 740, a relevance score may be obtained for each <noun word, adjective/adverb word> pair based on the scoring at 714, 724 and 732. For example, for a word pair, a sum or a weight sum of corresponding scores obtained at 714, 724 and 732 may be used as the relevance score for the word pair.

At 750, topic-to-emotion mappings or emotion-to-topic mappings in the topic-emotion graph may be established based on the relevance scores obtained at 740. For example, for a noun word, one or more adjective/adverb words having the top-ranked relevance scores with the noun word may be added into the topic-emotion graph, and thus topic-to-emotion mappings from the noun word to these adjective/adverb words may be included in the topic-emotion graph. Moreover, for example, for an adjective/adverb word, one or more noun words having the top-ranked relevance scores with the adjective/adverb word may be added into the topic-emotion graph, and thus emotion-to-topic mappings from the adjective/adverb word to these noun words may be included in the topic-emotion graph. In this way, one or more further stages of topic-to-emotion mappings and emotion-to-topic mappings may be included in the topic-emotion graph.

Figure 9:
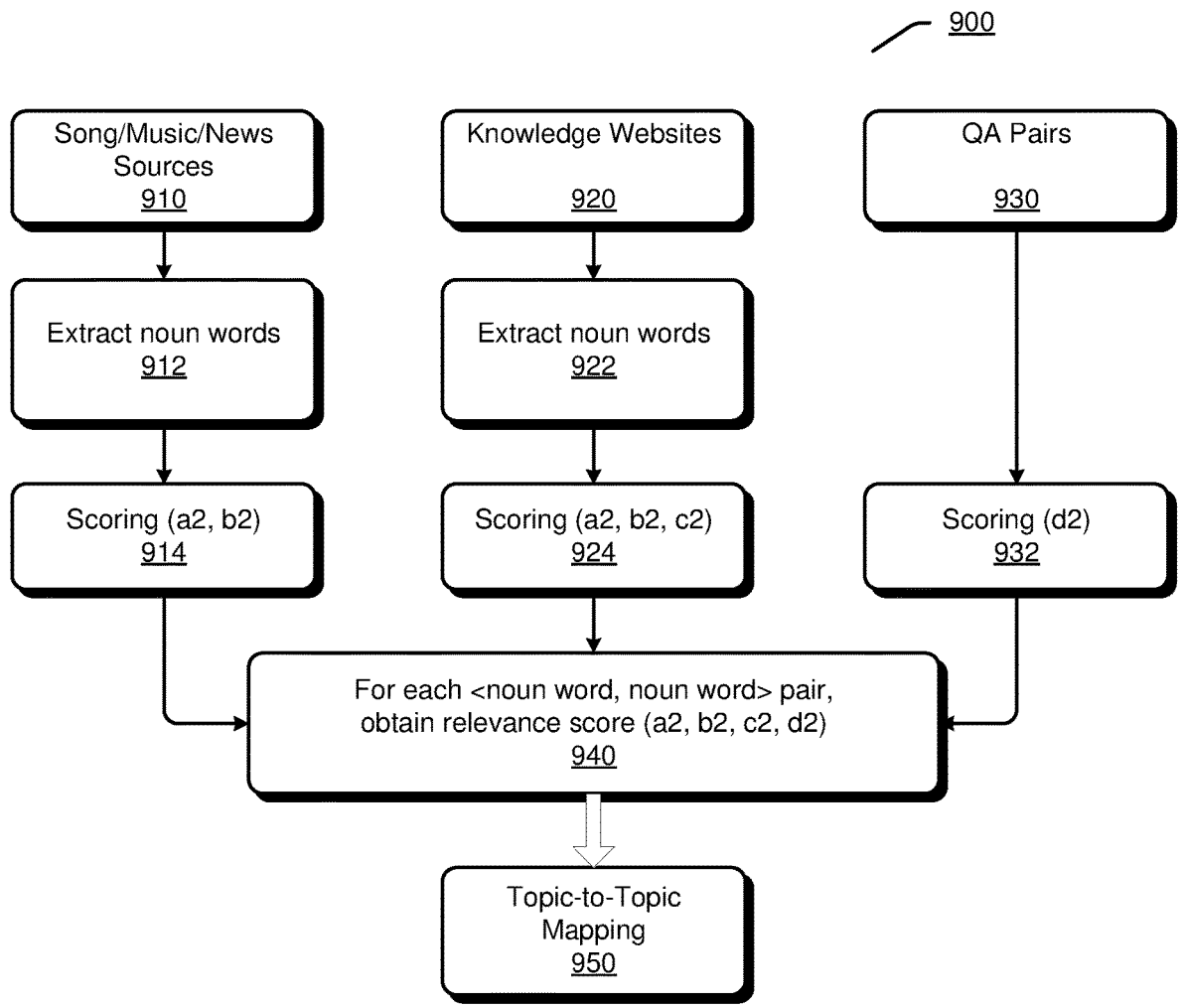
FIG. 9 illustrates an exemplary process for establishing a topic-emotion graph according to an embodiment.

FIG. 9 illustrates an exemplary process 900 for establishing a topic-emotion graph according to an embodiment. The process 900 may be used for determining word pairs that have topic-to-topic mappings in the topic-emotion graph. Topic-to-topic mappings may be established from various sources through data mining. Usually, a word pair having a topic-to-topic mapping may comprise two noun words.

In an implementation, the data mining may be performed on song, music or news sources 910.

At 912, noun words may be extracted from sentences in the song, music or news sources 910.

At 914, word pairs formed by the noun words, e.g., <noun word, noun word> pairs, may be scored based on dependency parsing. A word pair may be scored "a2" if there is a dependency arc between two words in the word pair, while the word pair may be scored "b2" if the two words in the word pair only appear in the same sentence, but there is no dependency arc between these two words.

In an implementation, the data mining may be performed on knowledge websites 920 on the network, e.g., Wikipedia. An exemplary page in the knowledge websites 920 may be: "Title=Japanese foods", and "Content=Natto has a powerful smell".

At 922, noun words may be extracted from pages in the knowledge websites 920. For example, as for the above exemplary page, the noun words "Japanese foods", "Natto", and "smell" may be extracted.

At 924, word pairs formed by the noun words may be scored. In an implementation, all word pairs formed by noun words in the Title and noun words in the Content may be scored "c2". For example, the word pair <Japanese foods, Natto> may be scored "c2". Moreover, the scoring mechanism of "a2" and "b2" at 914 may also be applied at 924. For example, the word pair <Natto, smell> may be scored "a2", etc.

In an implementation, the data mining may be performed on QA pairs 930 that may be from QA-style web sites, or from a pure chat index set used by the chatbot for free chatting.

At 932, for each QA pair, word alignment scores "d2" may be computed for word pairs formed by noun words in a question of the QA pair and noun words in an answer of the QA pair. In an implementation, IBM models 1-5 may be adopted at 932 for computing the word alignment scores.

It should be appreciated that although the word alignment scoring at 932 is discussed above as being performed on QA pairs, this word alignment scoring may also be performed in a similar way on sentence pairs, e.g., <current sentence, next sentence>, in a document.

Moreover, it should be appreciated that although the word alignment scoring at 732 in FIG. 7 and the word alignment scoring at 932 in FIG. 9 are discussed separately, these two word alignment scoring operations may also be performed jointly. For example, word alignment scoring may be performed on any word pairs firstly, irrespective of part-of-speeches of these words, then word alignment scores of word pairs formed by noun words and adjective/adverb words may be provided to the process 700 in FIG. 7, and word alignment scores of word pairs formed by noun words may be provided to the process 900 in FIG. 9 respectively.

At 940, a relevance score may be obtained for each <noun word, noun word> pair based on the scoring at 914, 924 and 932. For example, for a word pair, a sum or a weight sum of corresponding scores obtained at 914, 924 and 932 may be used as the relevance score for the word pair.

At 950, topic-to-topic mappings in the topic-emotion graph may be established based on the relevance scores obtained at 940. For example, for a noun word, one or more noun words having the top-ranked relevance scores with the noun word may be added into the topic-emotion graph, and thus topic-to-topic mappings from the noun word to the one or more noun words may be included in the topic-emotion graph. In this way, one or more further stages of topic-to-topic mappings may be included in the topic-emotion graph.

As mentioned above, the process 700 in FIG. 7 may be used for determining topic-to-emotion mappings and emotion-to-topic mappings, and the process 900 in FIG. 9 may be used for determining topic-to-topic mappings, and thus these two processes may be combined together to establish the topic-emotion graph.

Figure 10:
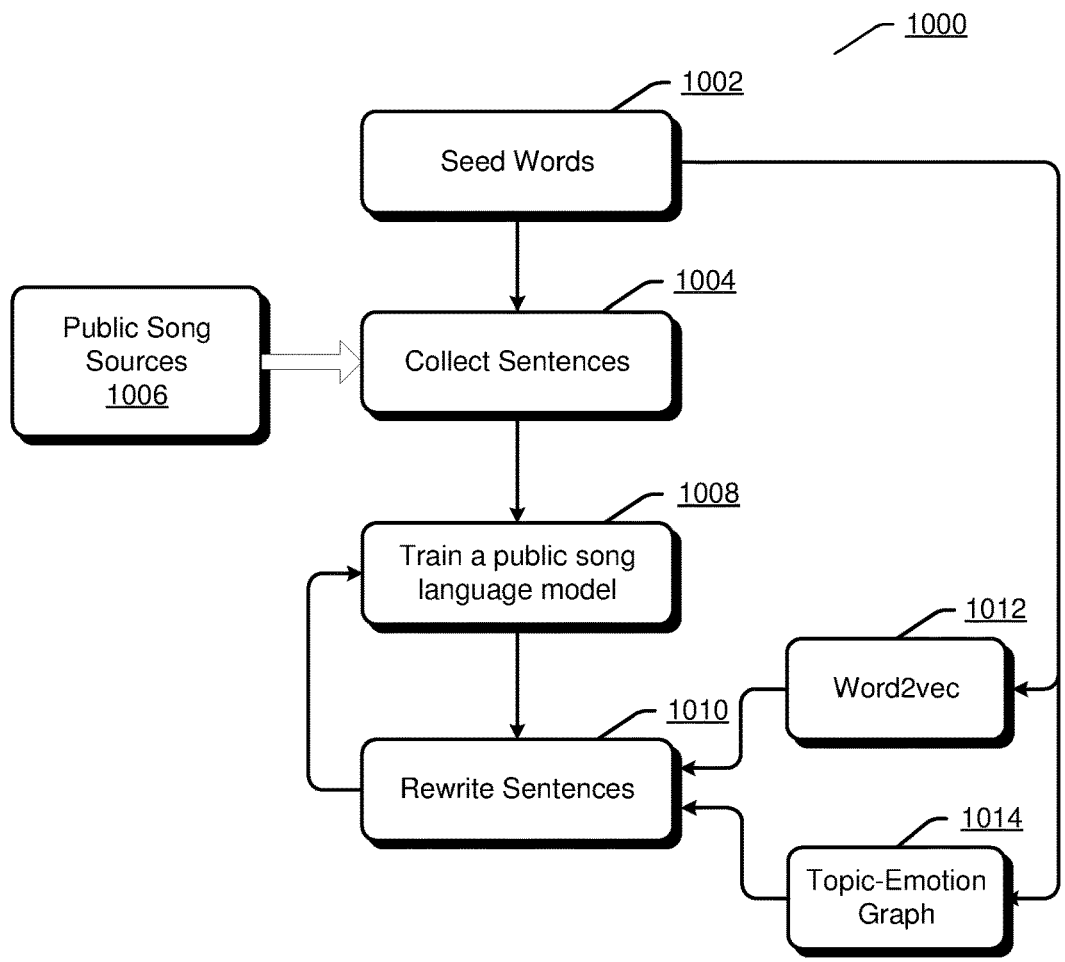
FIG. 10 illustrates an exemplary process for establishing a public song language model according to an embodiment.

FIG. 10 illustrates an exemplary process 1000 for establishing a public song language model according to an embodiment.

At 1002, one or more seed words may be determined from session logs of a user. Herein, "seed words" may refer to representative or important words that are most frequently used or recently discussed by the user in sessions with a chatbot, and "session logs" may refer to records of sessions between the user and the chatbot. The seed words may be determined from the session logs through various term-weight algorithms, e.g., term frequency-inverse document frequency (TF-IDF), etc.

At 1004, sentences may be collected from public song sources 1006 through matching with the seed words. For example, the collected sentences may be from lyrics of public songs in the public song sources 1006. The collected sentences may comprise at least one of the seed words. The collected sentences may be used as training data and form a training set.

Figure 11:
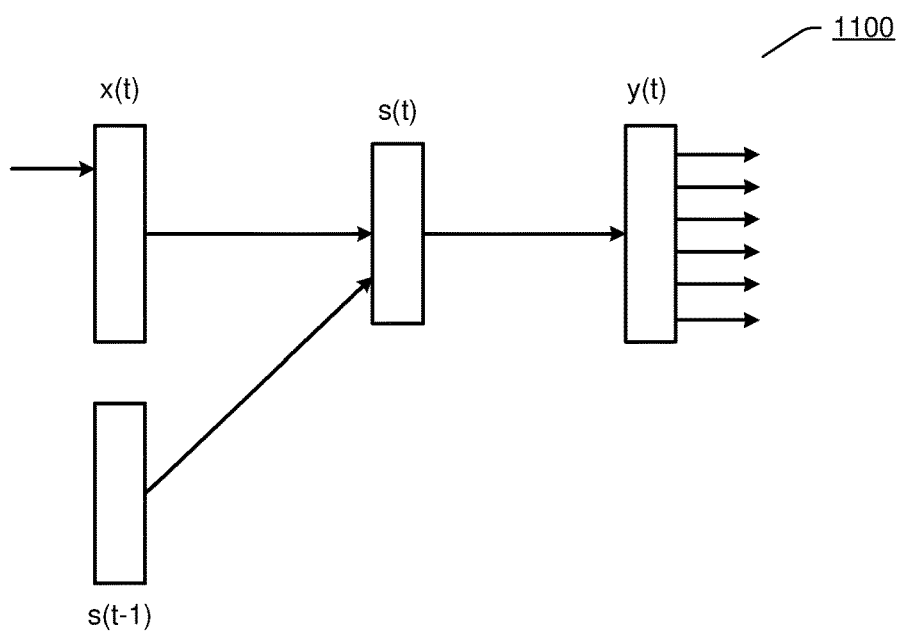
FIG. 11 illustrates an exemplary recurrent neural network (RNN) according to an embodiment.

At 1008, a public song language model may be trained based on the collected sentences in the training set. In an implementation, the public song language model may be a recurrent neural network language model (RNNLM). FIG. 11 illustrates an exemplary recurrent neural network (RNN) 1100 according to an embodiment. The RNN 1100 is a simplified network structure for showing basic principles, and a real recurrent neural network may be formed by iterations of the RNN 1100. As shown in FIG. 11, the RNN 1100 comprises an input layer x, a hidden layer s, and an output layer y, wherein the hidden layer is also called context layer or state layer. Input to the RNN 1100 at time t is x(t), output from the RNN 1100 is denoted as y(t), and s(t) is a hidden state of the RNN 1100. Input vector x(t) is formed by concatenating a vector w(t) representing the current word and an output s(t−1) from neurons in the context layer s at time t−1. Computations at the input, hidden and output layers are as follows:

$$x(t)=w(t)+s(t-1) \quad \text{Equation (1)}$$

$$s_j(t)=f(\Sigma_i x_i(t) u_{ji}) \quad \text{Equation (2)}$$

$$y_k(t)=g(\Sigma_j s(t) v_{kj}) \quad \text{Equation (3)}$$

where f(z) is a sigmoid activation function:

$$f(z) = \frac{1}{1+e^{-z}} \quad \text{Equation (4)}$$

g(z) is a softmax function:

$$g(z_m) = \frac{e^{z_m}}{\sum_k e^{z_k}} \quad \text{Equation (5)}$$

Through the training operation at 1008, the public song language model may be established for characterizing language expressions of lyrics of public songs.

In an implementation, the process 1000 may further comprise an updating procedure for the public song language model. For example, at 1010, the collected sentences in the training set may be rewritten through replacing seed words included in the collected sentences by extended words, wherein the extended words may refer to those words that are semantically relevant to the seed words. A word2vec process and/or a topic-emotion graph may be used for determining the extended words. At 1012, the word2vec process may be performed for finding extended words of the seed words in a vector space. At 1014, the topic-emotion graph may be used for finding extended words of the seed words through identifying those words that have a topic-to-topic mapping relationship, topic-to-emotion mapping relationship, or emotion-to-topic mapping relationship with the seed words. With the extended words, the collected sentences may be rewritten. For example, for a collected sentence "She is a pretty girl" including a seed word "pretty", if an extended word "beautiful" is determined for the seed word "pretty", then the collected sentence may be rewritten as "She is a beautiful girl".

The rewritten sentences obtained at 1010 may be used as new training data for extending the training set. Thus, the process 1000 may further update the public song language model based on the rewritten sentences. For example, the public song language model may be retrained based on the rewritten sentences. It should be appreciated that, in another implementation, before using a rewritten sentence as a new training data, it may be determined whether the rewritten sentence meets the public song language model. For example, the rewritten sentence may be input to the public song language model, and if the rewritten sentence is scored by the public song language model as above a threshold, the rewritten sentence may be deemed as meeting the public song language model, and thus may be used as a new training data.

Figure 12:
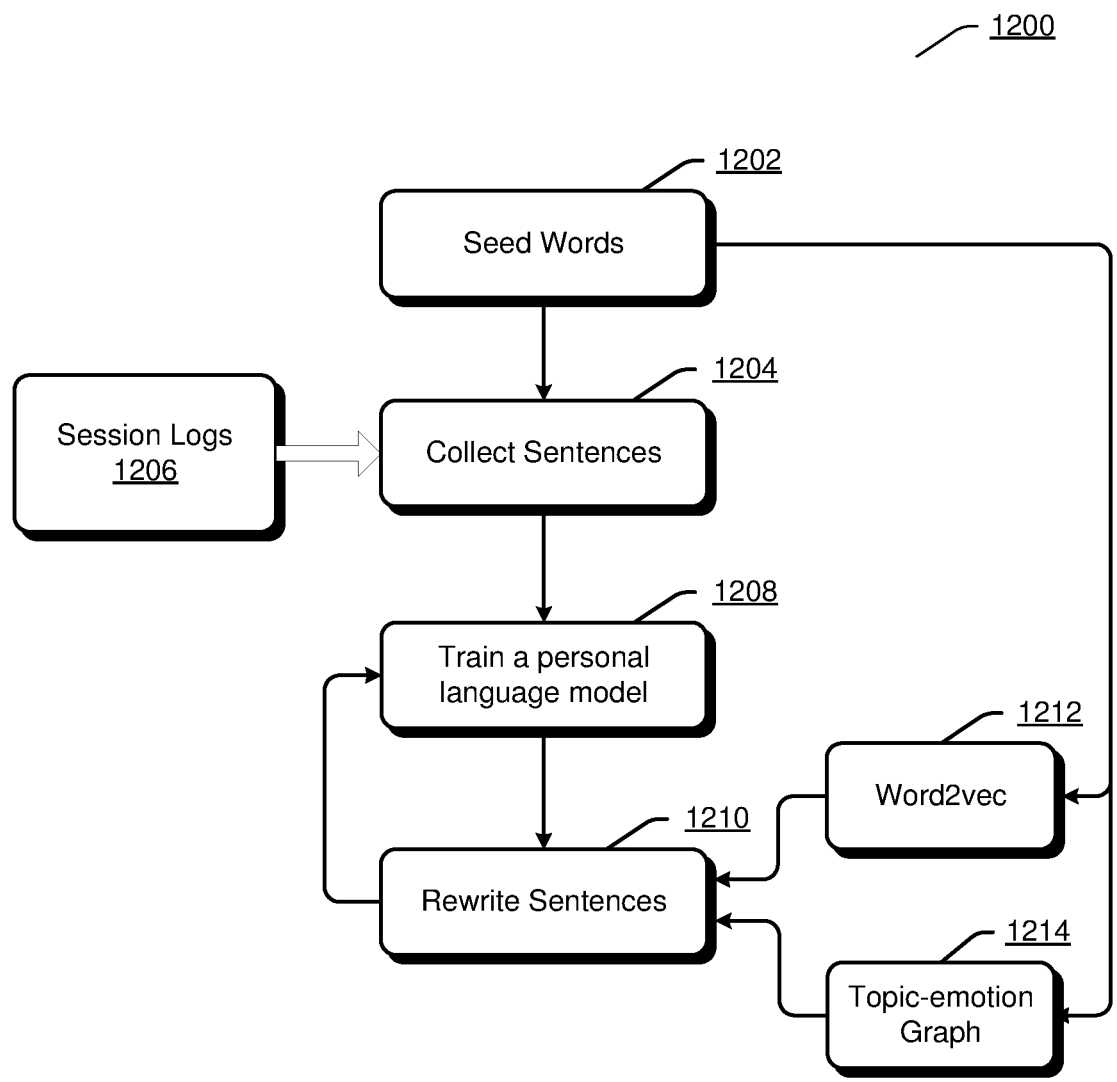
FIG. 12 illustrates an exemplary process for establishing a personal language model according to an embodiment.

FIG. 12 illustrates an exemplary process 1200 for establishing a personal language model of a user according to an embodiment.

At 1202, one or more seed words may be determined. The operation at 1202 is similar with the operation at 1002 in FIG. 10.

At 1204, sentences may be collected from session logs 1206 through matching with the seed words. For example, the collected sentences may be from historical sentences input by the user in the session logs 1206, and may comprise at least one of the seed words. The collected sentences may be used as training data and form a training set.

At 1208, a personal language model of the user may be trained based on the collected sentences in the training set. In an implementation, the personal language model may be a RNNLM. Through the training operation at 1208, the personal language model may be established for characterizing the user's language style or habits.

In an implementation, the process 1200 may further comprise an updating procedure for the personal language model. For example, at 1210, the collected sentences in the training set may be rewritten through replacing seed words included in the collected sentences by extended words. The extended words may be determined through a word2vec process at 1212 and/or through a topic-emotion graph at 1214, in a similar way with the operations at 1012 and 1014 in FIG. 10.

The rewritten sentences obtained at 1210 may be used as new training data for extending the training set. Thus, the process 1200 may further update the personal language model, e.g., retrain the personal language model, based on the rewritten sentences. It should be appreciated that, in another implementation, before using a rewritten sentence as a new training data, it may be determined whether the rewritten sentence meets the personal language model. For example, the rewritten sentence may be input to the personal language model, and if the rewritten sentence is scored by the personal language model as above a threshold, the rewritten sentence may be deemed as meeting the personal language model, and thus may be used as a new training data.

As discussed above in connection with FIG. 6 to FIG. 12, a topic-emotion graph, a public song language model and a personal language model of a user may be established respectively. At least one of the topic-emotion graph, the public song language model and the personal language model may be used during generating personalized lyrics from lyrics of a public song. As mentioned above, a neural machine translation architecture with attention mechanism may be adopted for generating the personalized lyrics from the lyrics of the public song.

Figure 13A:
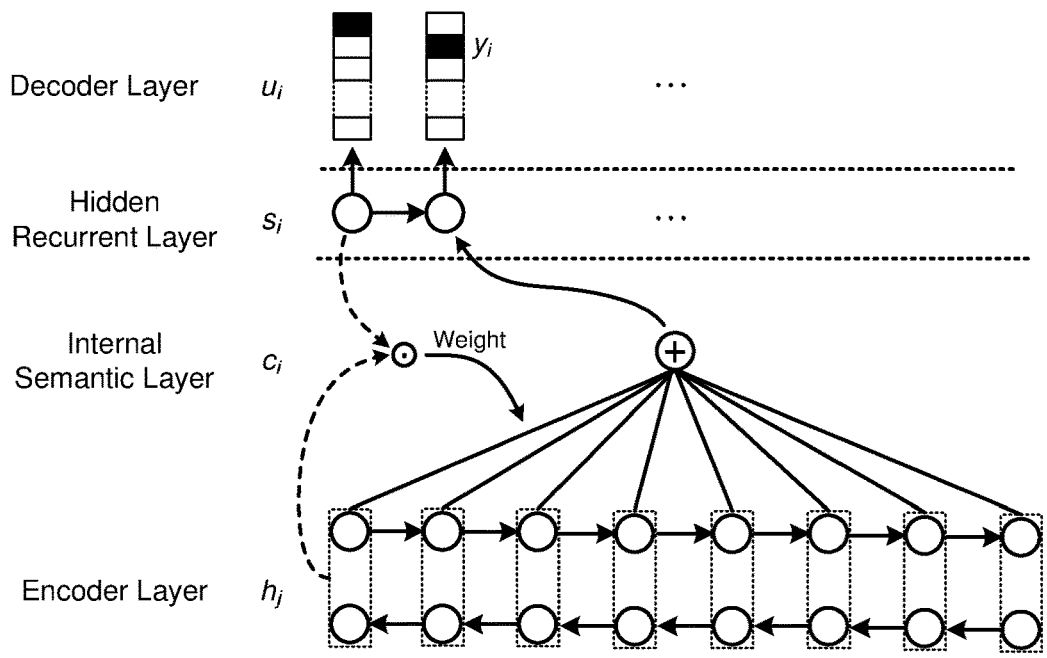
FIG. 13A and FIG. 13B illustrate an exemplary neural machine translation architecture with attention mechanism according to an embodiment.
Figure 13B:
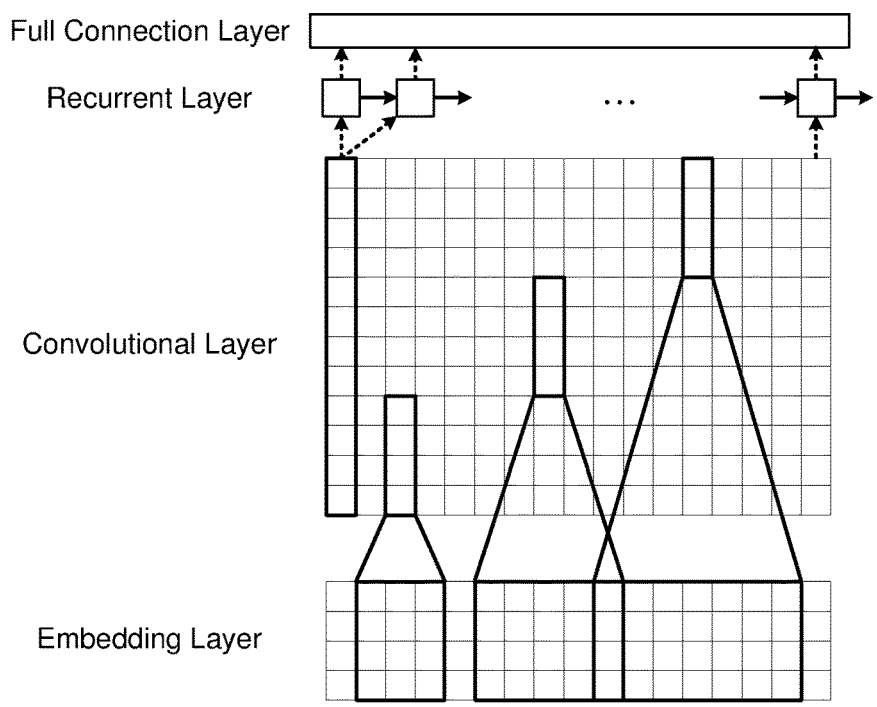

FIG. 13A and FIG. 13B illustrate an exemplary neural machine translation architecture with an attention mechanism according to an embodiment.

A neural machine translation architecture 1300 is shown in FIG. 13A, which has a encoder-decoder style structure, and may comprise an encoder layer, an internal semantic layer, a hidden recurrent layer, and a decoder layer.

At the encoder layer, bidirectional recurrent operations may be applied on an input sequence, such as, one or more words or a plain text, so as to obtain source vectors. There are two directions involved in the bidirectional recurrent operations, e.g., left-to-right and right-to-left. The bidirectional recurrent operations may be based on, such as, CNN-Long Shot Term Memory (LSTM) style recurrent neural networks. The encoder layer may also be referred to as "embedding" layer. The source vectors may be denoted by temporal annotation $h_j$, where j=1, 2, ..., $T_x$, and $T_x$ is the length of the input sequence, e.g., the number of words in the input sequence.

At the internal semantic layer, an attention mechanism may be implemented. A context vector $c_i$ may be computed based on a set of temporal annotations $h_j$ and may be taken as a temporal dense representation of the current input sequence. The context vector $c_i$ may be computed as a weighted sum of the temporal annotations $h_j$ as follows:

$$c_i = \Sigma_{j=1}^{T^x} a_{ij} h_j \quad \text{Equation (6)}$$

The weight $a_{ij}$ for each $h_j$ may also be referred to as "attention" weight, and may be computed by a softmax function:

$$\alpha_{ij} = \frac{\exp(e_{ij})}{\sum_{k=1}^{T_x} \exp(e_{ik})} \quad \text{Equation (7)}$$

where $e_{ij} = a(s_{i-1}, h_j)$ is an alignment model which scores how well inputs around a position j and an output at position i match with each other. The alignment score is between a pervious hidden state $s_{i-1}$ and the j-th temporal annotation $h_j$ of the input sequence. The probability $a_{ij}$ reflects importance of $h_j$ with respect to the previous hidden state $s_{i-1}$ in deciding the next hidden state $s_i$ and simultaneously generating the next word $y_i$. The internal semantic layer implements an attention mechanism through applying the weight $a_{ij}$.

At the hidden recurrent layer, hidden states $s_i$ for an output sequence are determined through unidirectional, e.g., left-to-right, recurrent operations. The unidirectional recurrent operations may be performed by, such as, unidirectional LSTM units.

At the decoder layer, word prediction for the next word $y_i$ may be determined as follows:

$$p(y_i|y_1, \ldots, y_{i-1}, x) = g(y_{i-1}, s_i, c_i) \quad \text{Equation (8)}$$

where $s_i$ is from the hidden recurrent layer, $c_i$ is from the internal semantic layer. Here, g(.) function is a nonlinear, potentially multi-layered function that outputs probabilities of the next candidate words in the output sequence. The decoder layer may also be referred to as an "output" layer.

The neural machine translation architecture 1300 may pick up "information-rich" words and change the words into "context-rich" words or sentences. Through implementing the attention mechanism in the internal semantic layer, relations between an information-rich word and corresponding context words may be captured. Moreover, it should be appreciated that it may be meaningless if only considering word-level. Thus, the neural machine translation architecture 1300 may apply recurrent operations on the input sequence and/or on the output sequence, such that context information for each word in the input sequence and/or for each word in the output sequence may be obtained and applied during determining the output sequence.

It should be appreciated that the structure of the encoder layer in FIG. 13A is exemplary, and the encoder layer may also be based on any other types of structure. FIG. 13B illustrates an alternative structure of the encoder layer, which is based on a recurrent convolutional neural network (RCNN) 1310. Besides processing in a word-level, the RCNN 1310 may also process in a character-level, which is suitable for some character-style Asian languages, e.g., Japanese, Chinese, etc. The RCNN 1310 may comprise an embedding layer, a convolutional layer, a recurrent layer and a full connection layer. The embedding layer may generate vectors for characters in an input sequence. The convolutional layer may perform convolution operations on the vectors from the embedding layer. The recurrent layer may perform recurrent operations on outputs of the convolutional layer. It should be appreciated that, although FIG. 13B shows unidirectional recurrent operations in the recurrent layer, bidirectional recurrent operations may also be applied in the recurrent layer. Finally, the full connection layer may provide an encoding result of the input sequence.

In some implementations, based on the neural machine translation architecture with attention mechanism shown in FIG. 13A and FIG. 13B, personalized lyrics of a user may be generated from lyrics of a public song.

As for a determined public song, a public song language model may be used for obtaining a word embedding vector for each word in lyrics of the public song. The obtained word embedding vectors may be provided as inputs to the encoder layer of the neural machine translation architecture. Then, through the attention mechanism in the neural machine translation architecture, a topic-emotion graph may be used for introducing new candidate words for personalized lyrics, thus enlarging the searching space in the following decoding process and providing additional diversity. For example, similarities between words in the public song's lyrics and words in the topic-emotion graph may be computed, and those words in the topic-emotion graph that are mostly relevant to the words in the public song's lyrics may be selected as candidate words. Then, a personal language model of the user may be used at the hidden recurrent layer in the neural machine translation architecture and further impose on outputs at the decoder layer in the neural machine translation architecture. For example, the personal language model may facilitate to score candidate words according to transition probabilities among the candidate words, and further to select the next word to be output. Since the personal language model may characterize the user's language style or habits, the selection of the next word through the personal language model may be deemed as a personalized selection, and thus the output from the decoder layer may also be personalized. Through the process discussed above, personalized lyrics may be generated finally by the neural machine translation architecture, that is, the lyrics of the public song may be transformed to the personalized lyrics of the user.

It should be appreciated that, in some cases, a sentence in the public song's lyrics may be transformed to more than one candidate sentence for the personalized lyrics, and thus an evaluation process may be performed. During the evaluation process, the candidate sentences may be scored by the personal language model, and a candidate sentence with the highest score may be selected to add into the personalized lyrics.

Moreover, it should be appreciated that sentences in the personalized lyrics may also be used as new training data for retraining the personal language model according to the process 1200 in FIG. 12, so as to refine the personal language model.

The personalized lyrics generated through the neural machine translation architecture with attention mechanism may be provided to the process 500 in FIG. 5, and further used for generating the personalized song as discussed above in connection with FIG. 5.

Figure 14:
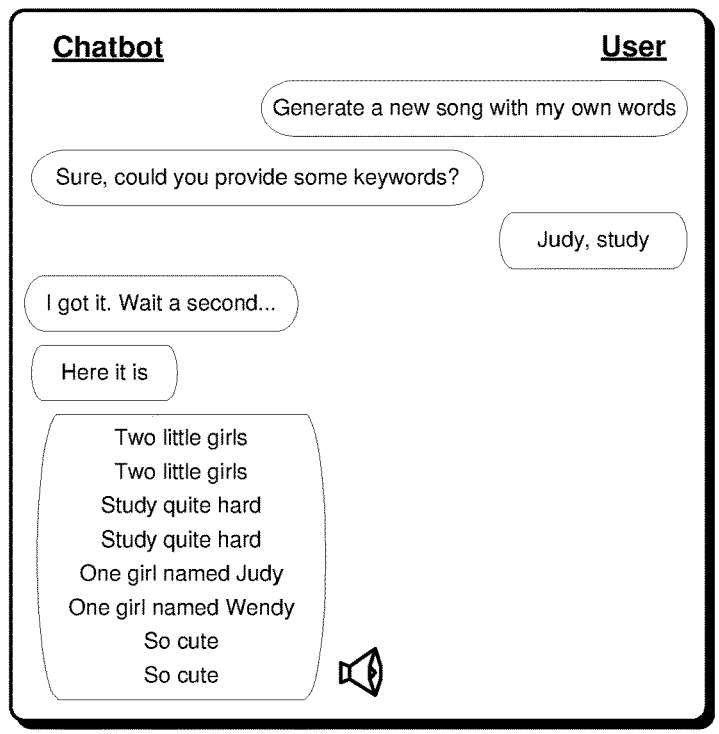
FIG. 14 illustrates exemplary chat windows according to an embodiment.
Figure 14:
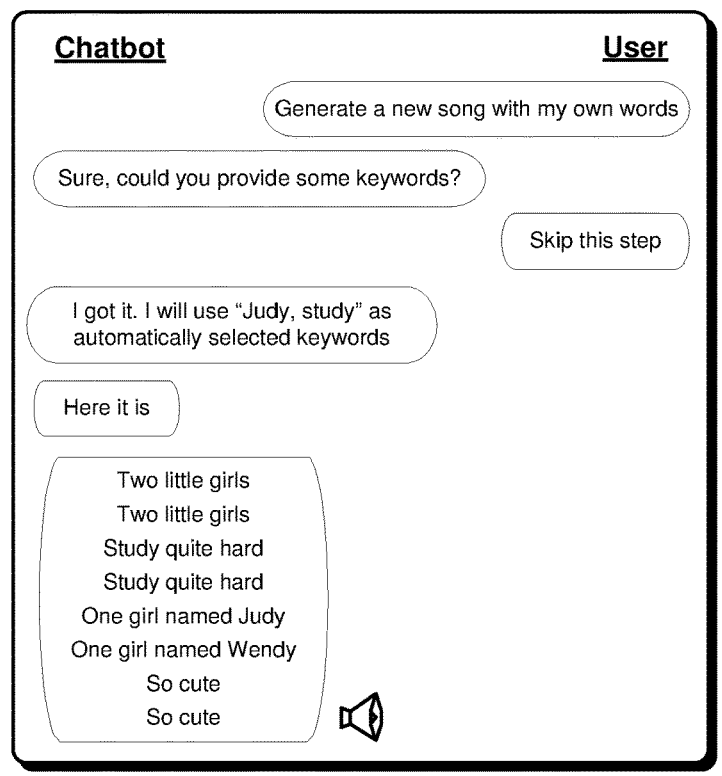

FIG. 14 illustrates exemplary chat windows 1400A and 1400B according to an embodiment. The chat windows 1400A and 1400B show exemplary chat flows in which a chatbot may provide a personalized song based on at least one keyword.

As shown in the chat window 1400A, when the user inputs a message "Generate a new song with my own words" to indicate that the user wants to obtain a personalized song, the chatbot may require the user to input at least one keyword by asking "could you provide some keywords?". Then the user may input keywords "Judy, study" explicitly, to indicate that the user wants to obtain a personalized song generated based on these two keywords. After generating the personalized song based on the keywords, the chatbot may present lyrics of the personalized song. Meanwhile, a loudspeaker icon is presented in the chat window, which may be clicked by the user to display the personalized song.

The chat window 1400B shows another case that the user does not provide keywords explicitly. As shown in the chat window 1400B, when the chatbot requires the user to input at least one keyword by asking "could you provide some keywords?", the user may answer by "Skip this step" to indicate that the user wants the chatbot to retrieve at least one keyword automatically. For example, the chatbot may determine keywords "Judy" and "study" automatically, and inform the user "I will use 'Judy, study' as automatically selected keywords". Then, after generating the personalized song based on the keywords, the chatbot may present lyrics of the personalized song, together with a loudspeaker icon for displaying the personalized song.

It should be appreciated that the chat windows 1400A and 1400B are exemplary, and the embodiments of the present disclosure are not limited to provide personalized songs through the chat flows shown in FIG. 14.

Figure 15:
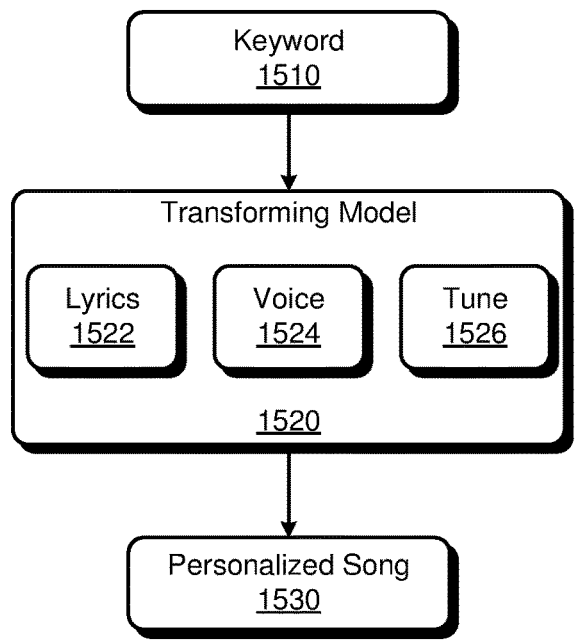
FIG. 15 illustrates an exemplary process for providing a personalized song according to an embodiment.

FIG. 15 illustrates an exemplary process 1500 for providing a personalized song according to an embodiment. The process 1500 may generate a personalized song based on at least one keyword.

At 1510, at least one keyword may be determined, for which a personalized song will be generated. In an implementation, the chatbot may receive the at least one keyword from a message input by the user. In an implementation, if the user does not provide any keyword but explicitly or implicitly indicates, in a message, that the chatbot should retrieve keywords automatically, the chatbot may determine the at least one keyword from session logs of the user automatically. For example, the chatbot may select one or more representative or important words that are most frequently used or recently discussed by the user in sessions with a chatbot as the at least one keyword. The selection of the keyword may be based on various term-weight algorithms, e.g., TF-IDF, etc.

At 1520, a transforming model may be used for processing the at least one keyword.

Figure 16:
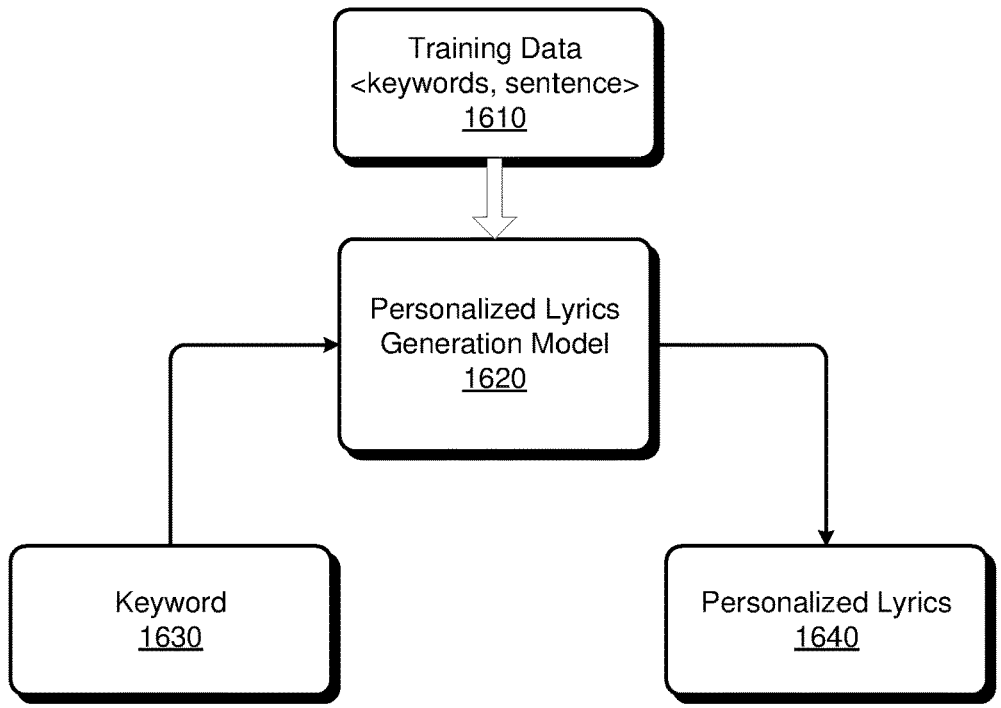
FIG. 16 illustrates an exemplary process for generating personalized lyrics according to an embodiment.

As shown in FIG. 15, the transforming model may comprise a personalized lyrics generation model 1522. The personalized lyrics generation model 1522 may be configured for generating the user's personalized lyrics from the keyword. For example, the keyword may be mapped to the user's personalized sentences so as to generate the personalized lyrics. FIG. 16 illustrates an exemplary process 1600 for generating personalized lyrics based on keywords according to an embodiment. At 1610, training data may be prepared, which is in a form of <keywords, sentence>. There are at least two approaches to obtain the training data. One approach is to crawl sentences from public song sources and retrieve keywords from these sentences, thus forming a set of training data based on the retrieved keywords and corresponding sentences. Another approach is to utilize public songs and personalized songs involved in the process 500 in FIG. 5. For example, as for a pair of <public song, personalized song> where the personalized song is generated from the public song, one or more keywords may be retrieved from sentences in lyrics of the public song or the personalized song, and the retrieved keywords and corresponding sentences may form a set of training data. Training data obtained through the two approaches may be combined together to train a personalized lyrics generation model 1620, which corresponds to the personalized lyrics generation model 1522 in FIG. 5. In an implementation, the personalized lyrics generation model 1620 may be based on the neural machine translation architecture with attention mechanism as shown in FIG. 13A and FIG. 13B, except that the neural machine translation architecture here is for transforming at least one keyword to personalized lyrics. During generating the personalized lyrics, at least one of a topic-emotion graph and a personal language model of the user may be used in the neural machine translation architecture. For example, in a similar way with the process of generating personalized lyrics from a public song's lyrics as mentioned above, the topic-emotion graph may be used in the attention mechanism for introducing new candidate words for personalized lyrics, and the personal language model may be used in the neural machine translation architecture for facilitating selection of the next word of the personalized lyrics. After the personalized lyrics generation model 1620 is trained, it may be further used for receiving at least one keyword 1630, e.g., the at least one keyword determined at 1510 in FIG. 15, as inputs, and output personalized lyrics 1640.

Figure 17:
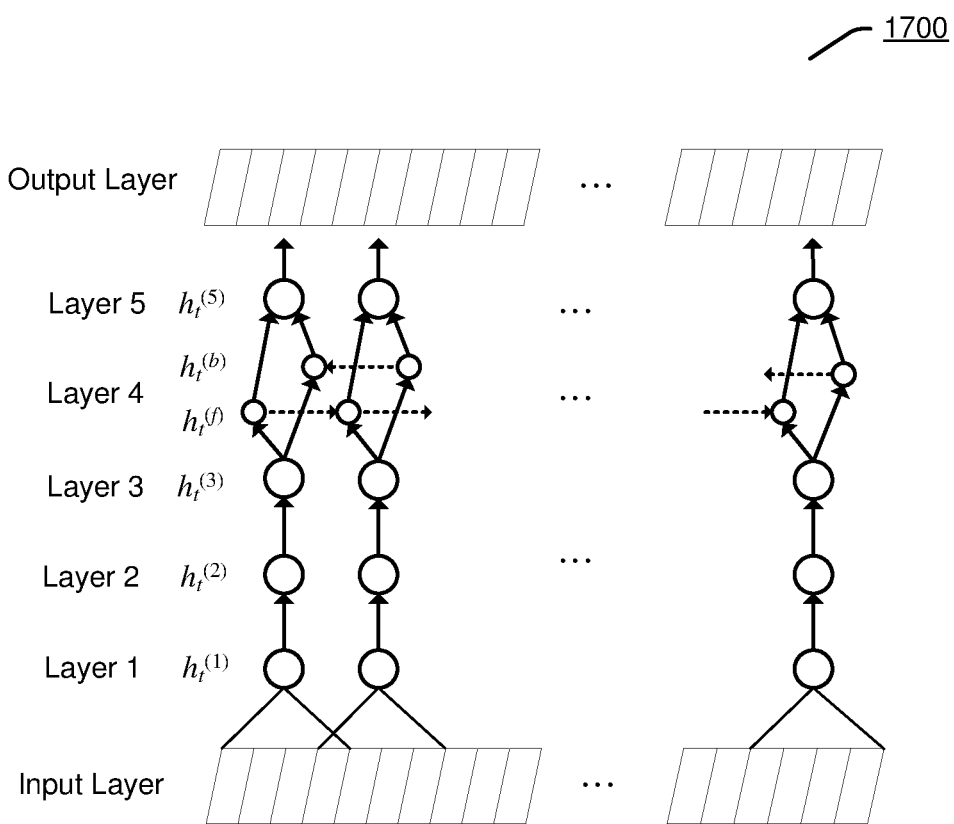
FIG. 17 illustrates an exemplary structure of a voice-based language model according to an embodiment.

As shown in FIG. 15, the transforming model may comprise a voice generation model 1524. The voice generation model 1524 may generate the user's own voices for the personalized lyrics. In an implementation, the voice generation model 1524 may be based on the neural machine translation architecture with attention mechanism as shown in FIG. 13A and FIG. 13B, except that the neural machine translation architecture here is for generating the user's voices based on the personalized lyrics. A voice-based language model for the user may be applied in the neural machine translation architecture. For example, the voice-based language model may be a RNNLM. FIG. 17 illustrates an exemplary structure of a voice-based language model 1700 according to an embodiment.

The voice-based language model 1700 may be used for processing the input current voice sequence to predict a next voice sequence which is one voice slice later than the current voice sequence. Training data for the voice-based language model 1700 may be obtained from the user's voices in historical voice chatting between the user and the chatbot. A voice segment $x^{(i)}$ may be inputted in an Input Layer. The voice segment $x^{(i)}$ may be a time-series with a length of $T^{(i)}$, and each slice is a vector of audio features, denoted as $x_t(i)$, where $t=1, 2, \ldots, T^{(i)}$. Spectrograms may be used as input features. As shown in FIG. 17, there are 5 layers of hidden units, denoted as Layer 1 to Layer 5. For an input sequence x, hidden units in Layer l are denoted as $h^{(l)}$, with a special case that $h^{(0)}$ may stand for the input sequence. Layer 1, Layer 2 and Layer 3 are not recurrent layers. For Layer 1, at each time t, an output depends on a spectrogram frame $x_t$ along with a context of S frames on each side. Empirically, the value of S may be selected from {3, 5, 7, 9} that minimum an error rate of a valuation set. Layer 2 and Layer 3 operate on independent data for each time step. Thus, for each time t, the first 3 layers may be computed as:

$$h_t^l = g(W^{(l)} h_t^{(l-1)} + b^{(l)})$$  Equation (9)

In Equation (9), a clipped Rectified-Linear activation function g(z) is used, and $W^{(l)}$ and $b^{(l)}$ are weight matrix and bias parameter for Layer l respectively. The function g(z) may be denoted as $g(z)=\min\{\max\{\alpha, z\}, \beta\}$, where $\alpha$ and $\beta$ are hyper-parameters, and can be adjusted empirically. Layer 4 is a bi-directional Gated Recurrent Unit (GRU) recurrent layer. This layer includes two sets of hidden units, one set for forward left-to-right recurrence $h^{(f)}$, and another set for backward right-to-left recurrence $h^{(b)}$. Layer 5 is a non-recurrent layer, which takes a concatenation of the forward units and the backward units in Layer 4 as inputs, and may be computed as:

$$h_t^5 = g(W^{(5)} h_t^{(4)} + b^{(5)})$$  Equation (10)

where $h_t^{(4)}$ is the concatenation of $h_t^{(f)}$ and $h_t^{(b)}$. Finally, the next voice sequence may be formed at an Output Layer based on outputs of Layer 5.

After establishing the voice-based language model, it may be applied in the neural machine translation architecture at the voice generation model 1524. Voice slices for each word of the personalized lyrics may be retrieved from historical voice chatting of the user, and then the voice-based language model may be used for transforming the voice slices into corresponding vectors. These vectors together with the personalized lyrics may be provided as inputs to the encoder layer of the neural machine translation architecture. Moreover, the voice-based language model may be used at the hidden recurrent layer in the neural machine translation architecture for facilitating selection of the next voice. Finally, the user's voices for the personalized lyrics may be output from the neural machine translation architecture.

It should be appreciated that, the voice generation model 1524 is not limited to generate the user's voices for the personalized lyrics through the neural machine translation architecture as discussed above. Instead, the voice generation model 1524 may also generate the user's voices through a TTS model in the same way as the voice generation model 524 in FIG. 5. Similarly, the voice generation model 524 in FIG. 5 may also generate the user's voices through the neural machine translation architecture in the same way as discussed above for the voice generation model 1524.

As shown in FIG. 15, the transforming model may comprise a tune generation model 1526. The tune generation model 1526 may be used for generating a tune for the personalized lyrics. For example, a musical note may be generated through the tune model 1526 for each word in the personalized lyrics. All the generated musical notes together may form a tune of the personalized song. In an implementation, the tune generation model 1526 may be based on a LSTM style or Generative Adversarial Network (GAN) style generation model. Training data for the tune generation model 1526 may be obtained from lyrics and tunes of existing songs. For example, words in lyrics of an existing song and corresponding musical notes in a tune of the existing song may form training data. The tune generation model 1526 may be trained for generating a set of musical notes for a set of words. After the tune generation model 1526 is established, it may be used for receiving the personalized lyrics of the personalized song as inputs, and outputting a tune of the personalized song.

At 1530, the personalized song may be formed through applying the tune generated by the tune generation model 1526 on the user's voices for the personalized lyrics output by the voice generation model 1524. The personalized song may be based on the personalized lyrics and the generated tune, and may be sound like the user is singing.

The personalized song may be kept by the user, stored in a user-specific song database, and/or stored in an all-user song database.

Figure 18:
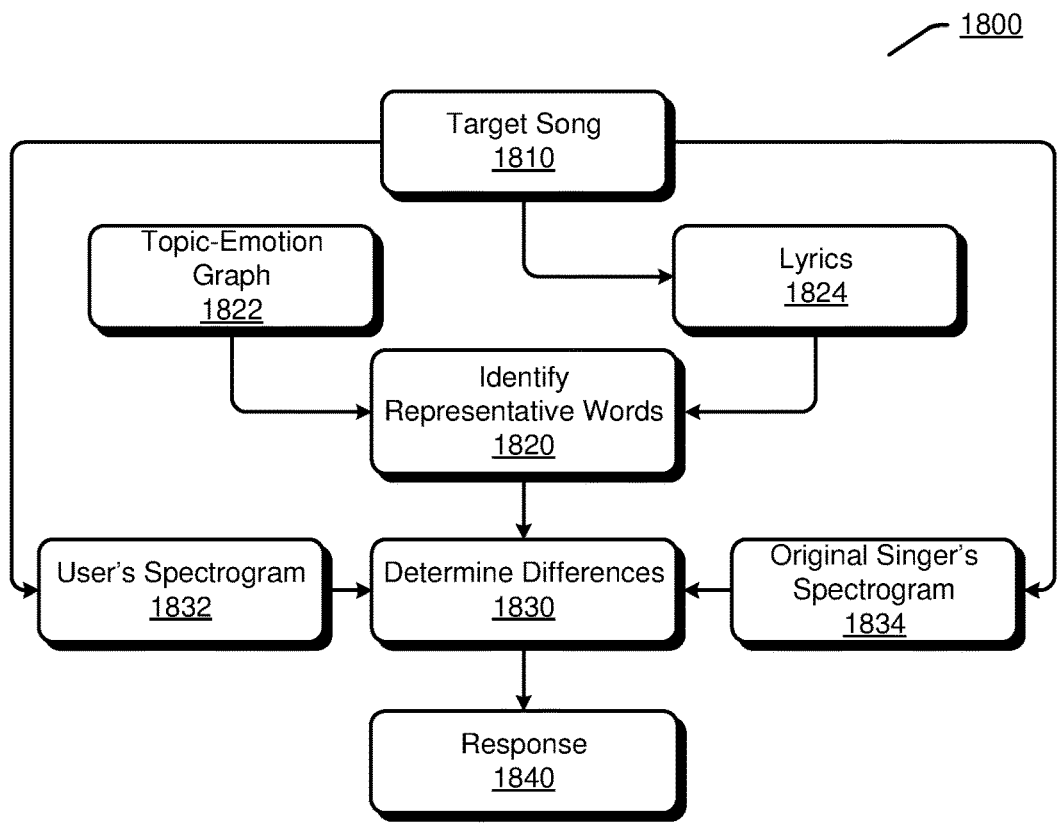
FIG. 18 illustrates an exemplary process for providing sing assessment according to an embodiment.

FIG. 18 illustrates an exemplary process 1800 for providing sing assessment according to an embodiment. Herein, "sing assessment" may refer to assessing a user's sing of a target song.

At 1810, a target song that is singing or was sung by the user may be identified. The user's sing may involve a part of the target song or the whole target song.

At 1820, representative words may be identified for the target song based on a topic-emotion graph 1822 and lyrics 1824 of the target song. Herein, "representative words" may refer to words in the lyrics 1824 that can have higher weights in the assessment of the user's sing as compared to other words. For example, a matching may be performed between the topic-emotion graph 1822 and the lyrics 1824. Those words in the lyrics 1824 that are also included in the topic-emotion graph 1822 may be identified as the representative words. Thus, the identified representative words may comprise topic words, emotion words, etc.

At 1830, differences between a spectrogram of the user's sing of the target song and a spectrogram of an original singer's sing of the target song may be determined. According to the process 1800, the user's spectrogram 1832 when the user is singing the target song may be obtained, and the original singer's spectrogram 1834 when the original singer of the target song is singing the target song may also be obtained. Then, a comparison may be performed between the user's spectrogram 1832 and the original singer's spectrogram 1834.

In an implementation, for each of the representative words, a first wave strength at the representative word in the user's spectrogram 1832 may be compared to a second wave strength at the representative word in the original singer's spectrogram 1834, and a difference between the first wave strength and the second wave strength may be obtained. In this way, differences between the user's spectrogram 1832 and the original singer's spectrogram 1834 may be determined.

In another implementation, irrespective of representative words, differences between the user's spectrogram 1832 and the original singer's spectrogram 1834 may be determined through comparisons of wave strength at each word of the lyrics of the target song. In this case, the operation of identifying representative words at 1820 may be omitted from the process 1800.

In another implementation, differences between the user's spectrogram 1832 and the original singer's spectrogram 1834 may be determined through both comparisons of wave strength at each representative word and comparisons of wave strength at each non-representative word in the lyrics of the target song. In this case, results of the comparisons of wave strength at the representative words may be given higher weights than results of the comparisons of wave strength at the non-representative words.

In another implementation, the determination of differences between the user's spectrogram 1832 and the original singer's spectrogram 1834 may comprise determining timing differences when the user and the original singer is singing the same word of the lyrics. For example, it may be determined, for one or more words of the lyrics, whether the user sings these words faster or slower than the original singer.

At 1840, a response may be generated based on the differences determined at 1830, and may be provided to the user in a chat flow with the user. In an implementation, the response may comprise an assessment result of the user's sing. For example, the response may comprise a score or level that is determined based on the differences. If the differences are below one or more predefined thresholds, a relatively high score or level may be provided in the response. In an implementation, the response may comprise a suggestion for the user to improve sing techniques. For example, the response may suggest the user to enhance an accent at a certain word, if it is determined at 1830 that the wave strength of the user's sing at the word is lower than the wave strength of the original singer's sing at the word by a predefined threshold. Moreover, for example, the response may suggest the user to slow down at a certain part of the target song, if it is determined at 1830 that the user's sing is faster at this part as compared to the original singer's sing.

Figure 19:
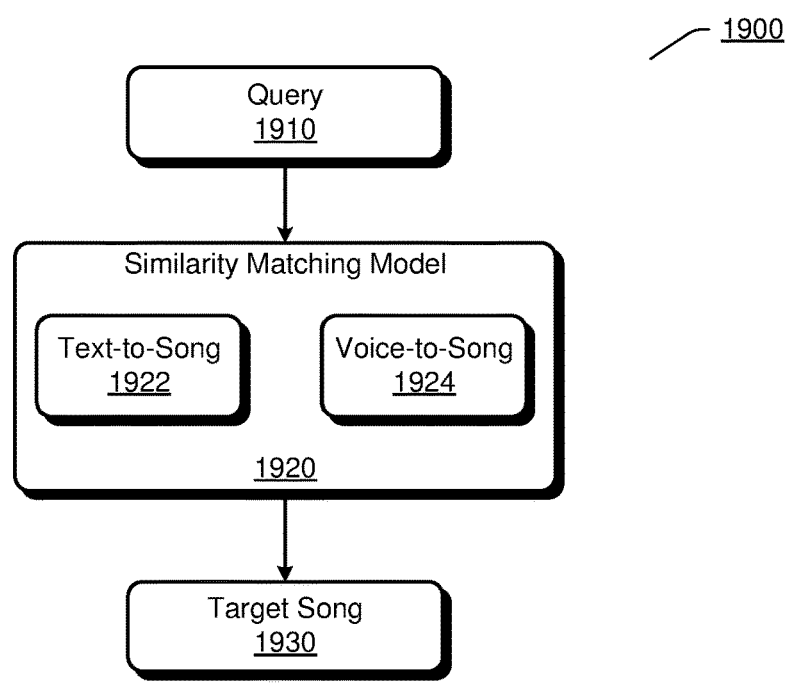
FIG. 19 illustrates an exemplary process for retrieving a target song according to an embodiment.

FIG. 19 illustrates an exemplary process 1900 for retrieving a target song according to an embodiment. In some cases, a chatbot may be requested by a user to provide a specific song, and the process 1900 may be performed for retrieving the song in response to the user's request.

At 1910, a query on a target song may be received in a chat flow. The query may be in a form of text or voice, and may comprise information about the target song. For example, the query may comprise a name of the target song, e.g., "Two Tigers", the query may comprise keywords of the target song, e.g., "Judy, study" etc., and so on.

At 1920, a similarity matching model may be used for retrieving the target song. The target song may be determined from a set of candidate songs that are retrieved from, such as, public song sources, user-specific song databases, an all-user song database, etc. The similarity matching model may comprise a text-to-song similarity model 1922 and a voice-to-song similarity model 1924. If the query is in a form of text, the text-to-song similarity model 1922 may be used for performing similarity matching between texts of the query and texts of candidate songs. While if the query is in a form of voice, the voice-to-song similarity model 1924 may transform voices of the query to texts firstly and then invoke the text-to-song similarity model 1922 to perform similarity matching between the transformed texts of the query and texts of candidate songs. The following discussion will take the text-to-song similarity model 1922 as an example, wherein texts of a text-form query or transformed texts of a voice-form query is called "query" for short, and texts of candidate songs is called "candidate songs" for short.

The text-to-song similarity model 1922 may make use of a pair-wise learning-to-rank (LTR) framework with gradient boosting decision tree (GBDT) algorithm, for ranking candidate songs for a given query.

In some implementations, for a query, songs may be separated into two types: good songs and bad songs.

The good songs may be with relatively good semantic similarity with the query. To obtain training instances of "good songs", a group of songs may be obtained from available public song sources, user-specific song databases, all-user song database, etc., and then keywords may be extracted from each of the group of songs. In this way, each song will have a set of keywords. All non-empty subsets of this set of keywords may be ranged over and taken as queries to the corresponding song. Thus, a large-scale training data in a form of <query, good song> may be constructed.

The bad songs may refer to those songs that are not relevant to the current concerned query or are relevant to another query which has no relation with the current concerned query. The bad songs may be determined based on user's next round feedbacks. For example, if a song is provided in response to a query from the user, and the user indicates that this song is not what he is requested, then this song may be determined as a bad song for the query. In this way, a large-scale training data in a form of <query, bad song> may be constructed.

Through combining <query, good song> and <query, bad song>, a list of tuples <query, good song, bad song> may be finally obtained and may be used for training the GBDT so as to obtain the text-to-song similarity model 1922.

Input to the text-to-song similarity model 1922 may be a query from a user, and output of the text-to-song similarity model 1922 may be scores of candidate songs.

In an implementation, a feature in the GBDT may be based on a language model for information retrieval. This feature may evaluate relevance between a query q and a candidate song Q through:

$$P(q|Q) = \Pi_{w \in q}[(1-\lambda)P_{ml}(w|Q) + \lambda P_{ml}(w|C)] \qquad \text{Equation (11)}$$

where $P_{ml}(w|Q)$ is the maximum likelihood of word w estimated from Q, and $P_{ml}(w|C)$ is a smoothing item that is computed as the maximum likelihood estimation in a large-scale corpus C, e.g., the public song sources, the user-specific song databases, the all-user song database, etc. The smoothing item avoids zero probability, which stems from those words appearing in the query q but not in the candidate song Q. $\lambda$ is a parameter that acts as a trade-off between the likelihood and the smoothing item, where $\lambda \in [0, 1]$. This feature works well when there are a number of words overlapped between the query and the candidate song.

In an implementation, a feature in the GBDT may be based on a translation-based language model. This feature may learn word-to-word and/or phrase-to-phrase translation probability for <query, good song> pairs, and may incorporate the learned information into the maximum likelihood. Given a query q and a candidate song Q, the translation-based language model may be defined as:

$$P_{trb}(q|Q) = \Sigma_{w \in q}[(1-\lambda)P_{mx}(w|Q) + \lambda P_{ml}(w|C)] \qquad \text{Equation (12)}$$

$$\text{where } P_{mx}(w|Q) = \alpha P_{ml}(w|Q) + \beta P_{tr}(w|Q) \qquad \text{Equation (13)}$$

$$P_{tr}(w|Q) = \Sigma_{v \in Q} P_{tp}(w|v) P_{ml}(v|Q) \qquad \text{Equation (14)}$$

Here λ, α and β are parameters satisfying λ∈[0, 1] and α+β=1. $P_{tp}(w|v)$ is a translation probability from word v in Q to word w in q. $P_{tr}(.)$, $P_{mx}(.)$ and $P_{trb}(.)$ are similarity functions constructed step-by-step by using $P_{tp}(.)$ and $P_{ml}(.)$.

In an implementation, a feature in the GBDT may be an edit distance between a query and a candidate song in a word or character level.

In an implementation, a feature in the GBDT may be a maximum subsequence ratio between a query and a candidate song.

In an implementation, a feature in the GBDT may be a cosine similarity score output by a deep semantic similarity model (DSSM) with a RNN using GRUs. The cosine similarity score may be an evaluation for similarity between a query and a candidate song. The query and the candidate song may be input into a respective RNN-GRU layer so as to obtain corresponding dense vectors. The dense vectors may be further used for determining a similarity score between the query and the candidate song.

Through the trained text-to-song similarity model 1922, candidate songs may be scored in response to the query received at 1910.

At 1920, the target song may be determined as a candidate song that has a top-ranked score. The target song may be provided to the user in the chat flow.

Figure 20:
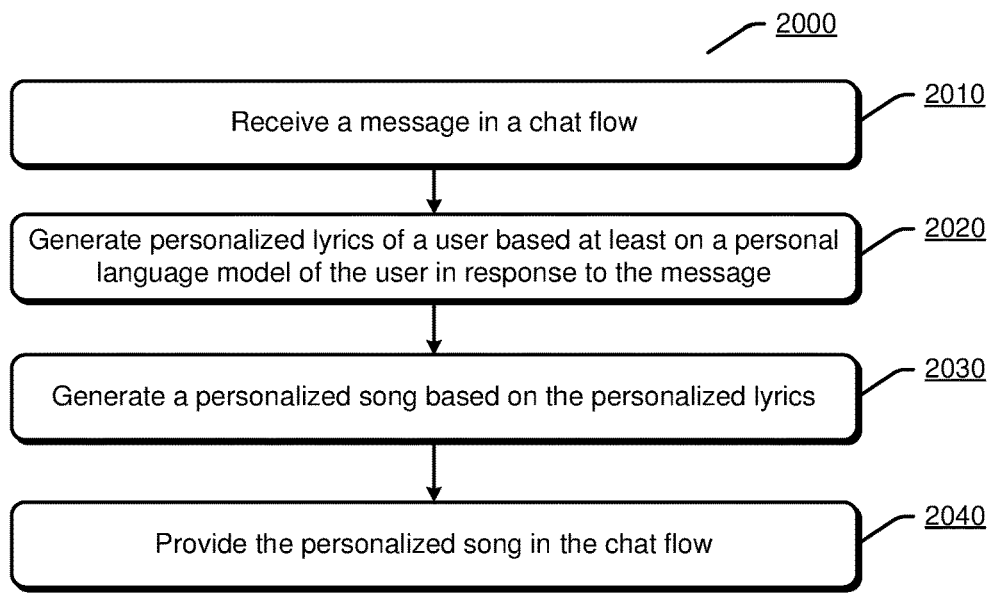
FIG. 20 illustrates a flowchart of an exemplary method for providing personalized songs in automated chatting according to an embodiment.

FIG. 20 illustrates a flowchart of an exemplary method 2000 for providing personalized songs in automated chatting according to an embodiment.

At 2010, a message may be received in a chat flow.

At 2020, personalized lyrics of a user may be generated based at least on a personal language model of the user in response to the message.

At 2030, a personalized song may be generated based on the personalized lyrics.

At 2040, the personalized song may be provided in the chat flow.

In an implementation, the message may indicate a public song, and the generating the personalized lyrics may comprise: generating the personalized lyrics through mapping sentences in the public song's lyrics to the user's personalized sentences based at least on the personal language model. The generating the personalized song may comprise at least one of: generating the user's voices for the personalized lyrics, and applying the public song's tune on the user's voices; and generating voices of an original singer of the public song for the personalized lyrics, and applying the public song's tune on the original singer's voices.

In an implementation, the message may contain at least one keyword or indicates to retrieve at least one keyword automatically, and the generating the personalized lyrics may comprise: generating the personalized lyrics through mapping the at least one keyword to the user's personalized sentences based at least on the personal language model. The generating the personalized song may comprise: generating a tune of the personalized song based on the personalized lyrics; generating the user's voices for the personalized lyrics; and applying the tune of the personalized song on the user's voices.

In an implementation, the personalized lyrics may be generated further based on a topic-emotion graph, the topic-emotion graph comprising a plurality of topic words and a plurality of emotion words that are associated with each other.

In an implementation, the personal language model may be established through: determining at least one seed word from session logs of the user; extracting, from the session logs, at least one sentence that contains the at least one seed word and is input by the user; and training the personal language model based on the at least one sentence. The method may further comprise: determining at least one extended word based on the at least one seed word through a Word2vec process or a topic-emotion graph; rewriting the at least one sentence based on the extended word; and updating the personal language model by the at least one rewritten sentence.

In an implementation, the personalized lyrics may be generated further based on a public song language model which is established through: determining at least one seed word from session logs of the user; extracting, from public song sources, at least one sentence that contains the at least one seed word; and training the public song language model based on the at least one sentence. The method may further comprise: determining at least one extended word based on the at least one seed word through a Word2vec process or a topic-emotion graph; rewriting the at least one sentence based on the extended word; and updating the public song language model by the at least one rewritten sentence.

In an implementation, the generating the personalized lyrics may be based on a neural machine translation architecture with attention mechanism.

In an implementation, the method may further comprise: obtaining a first spectrogram when the user is singing a target song; obtaining a second spectrogram when an original singer of the target song is singing the target song; determining differences between the first spectrogram and the second spectrogram; and providing a response based at least on the differences in the chat flow. The determining the differences may comprise: identifying at least one representative word in lyrics of the target song based on a topic-emotion graph; comparing a first wave strength at the at least one representative word in the first spectrogram and a second wave strength at the at least one representative word in the second spectrogram; and determining the differences based at least on the comparing between the first wave strength and the second wave strength.

In an implementation, the method may further comprise: receiving a query that is associated with a target song; retrieving the target song based on the query through a similarity matching model; and providing the target song in the chat flow.

It should be appreciated that the method 2000 may further comprise any steps/processes for providing personalized songs in automated chatting according to the embodiments of the present disclosure as mentioned above.

Figure 21:
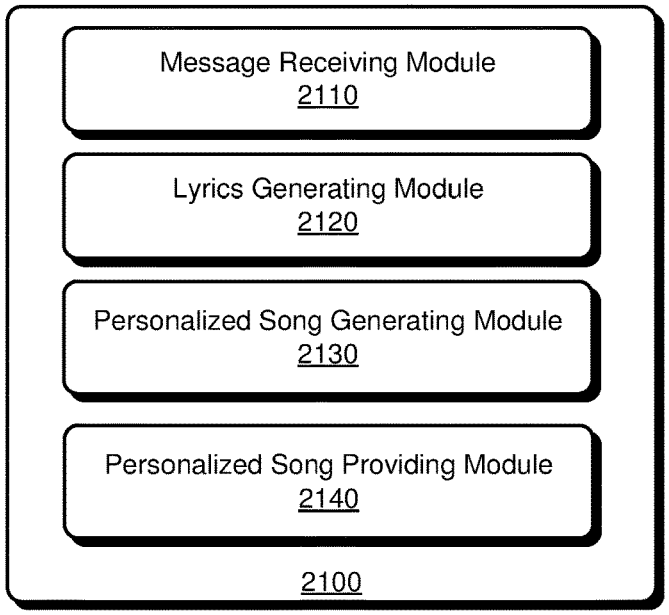
FIG. 21 illustrates an exemplary apparatus for providing personalized songs in automated chatting according to an embodiment.

FIG. 21 illustrates an exemplary apparatus 2100 for providing personalized songs in automated chatting according to an embodiment.

The apparatus 2100 may comprise: a message receiving module 2110, for receiving a message in a chat flow; a lyrics generating module 2120, for generating personalized lyrics of a user based at least on a personal language model of the user in response to the message; a personalized song generating module 2130, for generating a personalized song based on the personalized lyrics; and a personalized song providing module 2140, for providing the personalized song in the chat flow.

In an implementation, the message may indicate a public song, and the lyrics generating module may be further for: generating the personalized lyrics through mapping sentences in the public song's lyrics to the user's personalized sentences based at least on the personal language model.

In an implementation, the message may contain at least one keyword or indicates to retrieve at least one keyword automatically, and the lyrics generating module may be further for: generating the personalized lyrics through mapping the at least one keyword to the user's personalized sentences based at least on the personal language model.

In an implementation, the personalized lyrics may be generated further based on a topic-emotion graph, the topic-emotion graph comprising a plurality of topic words and a plurality of emotion words that are associated with each other.

In an implementation, the apparatus may further comprise: a first spectrogram obtaining module, for obtaining a first spectrogram when the user is singing a target song; a second spectrogram obtaining module, for obtaining a second spectrogram when an original singer of the target song is singing the target song; a difference determining module, for determining differences between the first spectrogram and the second spectrogram; and a response providing module, for providing a response based at least on the differences in the chat flow.

In an implementation, the apparatus may further comprise: a query receiving module, for receiving a query that is associated with a target song; a target song retrieving module, for retrieving the target song based on the query through a similarity matching model; and a target song providing module, for providing the target song in the chat flow.

Moreover, the apparatus 2100 may also comprise any other modules configured for providing personalized songs in automated chatting according to the embodiments of the present disclosure as mentioned above.

Figure 22:
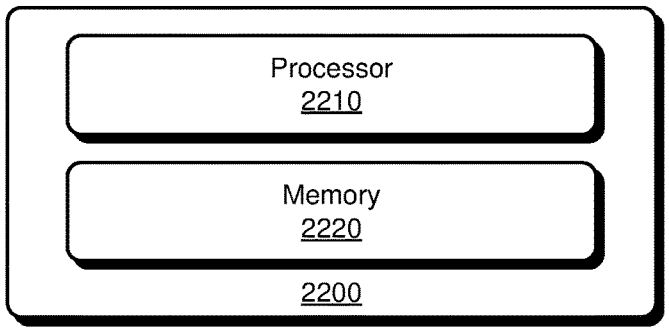
FIG. 22 illustrates an exemplary apparatus for providing personalized songs in automated chatting according to an embodiment.

FIG. 22 illustrates an exemplary apparatus 2200 for providing personalized songs in automated chatting according to an embodiment.

The apparatus 2200 may comprise at least one processor 2210. The apparatus 2200 may further comprise a memory 2220 that is connected with the processor 2210. The memory 2220 may store computer-executable instructions that, when executed, cause the processor 2210 to perform any operations of the methods for providing personalized songs in automated chatting according to the embodiments of the present disclosure as mentioned above. Alternatively, the memory 2220 may also be omitted from the apparatus 2200.

The embodiments of the present disclosure may be embodied in a non-transitory computer-readable medium. The non-transitory computer-readable medium may comprise instructions that, when executed, cause one or more processors to perform any operations of the methods for providing personalized songs in automated chatting according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for providing personalized songs in automated chatting, comprising:
   receiving a message comprising a plurality of words including a keyword in a chat flow displayed at a user interface;
   generating personalized lyrics of a user in a language style of the user, based on applying at least the keyword to a personal language model of the user in response to the message, the personal language model previously trained on a training dataset comprising sentences corresponding to the user for characterizing the language style of the user when generating the personalized lyrics, the personalized lyrics being different than the plurality of words included in the message;
   generating a personalized song based on the personalized lyrics in the language style of the user; and
   displaying to the user the personalized song in the chat flow at the user interface.

2. The method of claim 1, wherein the message indicates a public song, and the generating the personalized lyrics comprises:

generating the personalized lyrics through mapping sentences in the public song's lyrics to the user's personalized sentences based at least on the personal language model.

3. The method of claim 2, wherein the generating the personalized song comprises at least one of:
generating the user's voices for the personalized lyrics, and applying the public song's tune on the user's voices; and
generating voices of an original singer of the public song for the personalized lyrics, and applying the public song's tune on the original singer's voices.

4. The method of claim 2, wherein the generating the personalized lyrics is based on a neural machine translation architecture with attention mechanism.

5. The method of claim 1, wherein the message contains at least one keyword or indicates to retrieve at least one keyword automatically, and the generating the personalized lyrics comprises:
generating the personalized lyrics through mapping the at least one keyword to the user's personalized sentences based at least on the personal language model.

6. The method of claim 5, wherein the generating the personalized song comprises:
generating a tune of the personalized song based on the personalized lyrics; generating the user's voices for the personalized lyrics; and
applying the tune of the personalized song on the user's voices.

7. The method of claim 1, wherein the personalized lyrics are generated further based on a topic-emotion graph, the topic-emotion graph comprising a plurality of topic words and a plurality of emotion words that are associated with each other.

8. The method of claim 1, wherein the personal language model is established through:
determining at least one seed word from session logs of the user;
extracting, from the session logs, at least one sentence that contains the at least one seed word and is input by the user; and
training the personal language model based on the at least one sentence.

9. The method of claim 8, further comprising:
determining at least one extended word based on the at least one seed word through a Word2vec process or a topic-emotion graph;
rewriting the at least one sentence based on the extended word; and updating the personal language model by the at least one rewritten sentence.

10. The method of claim 1, wherein the personalized lyrics are generated further based on a public song language model which is established through:
determining at least one seed word from session logs of the user;
extracting, from public song sources, at least one sentence that contains the at least one seed word; and
training the public song language model based on the at least one sentence.

11. The method of claim 10, further comprising:
determining at least one extended word based on the at least one seed word through a Word2vec process or a topic-emotion graph;
rewriting the at least one sentence based on the extended word; and
updating the public song language model by the at least one rewritten sentence.

12. The method of claim 1, further comprising:
obtaining a first spectrogram when the user is singing a target song;
obtaining a second spectrogram when an original singer of the target song is singing the target song;
determining differences between the first spectrogram and the second spectrogram; and
providing a response based at least on the differences in the chat flow.

13. The method of claim 12, wherein the determining the differences comprises: identifying at least one representative word in lyrics of the target song based on
a topic-emotion graph;
comparing a first wave strength at the at least one representative word in the first spectrogram and a second wave strength at the at least one representative word in the second spectrogram; and
determining the differences based at least on the comparing between the first wave strength and the second wave strength.

14. The method of claim 1, further comprising:
receiving a query that is associated with a target song;
retrieving the target song based on the query through a similarity matching model; and
providing the target song in the chat flow.

15. An apparatus for providing personalized songs in automated chatting, the apparatus comprising:
a processor; and
a storage device that stores computer-executable instructions that are executable by the processor to cause the apparatus to at least:
receive a message comprising a plurality of words including a keyword in a chat flow displayed at a user interface;
generate personalized lyrics of a user based on applying at least the keyword to a personal language model of the user in response to the message, the personal language model previously trained on a training dataset comprising sentences corresponding to the user for characterizing the language style of the user when generating the personalized lyrics, the personalized lyrics being different than the plurality of words included in the message;
generate a personalized song based on the personalized lyrics in the language style of the user; and
display to the user the personalized song in the chat flow at the user interface.

16. The apparatus of claim 15, wherein the message indicates a public song, and the apparatus is further caused to:
generating the personalized lyrics through mapping sentences in the public song's lyrics to the user's personalized sentences based at least on the personal language model.

17. The apparatus of claim 15, wherein the message contains at least one keyword or indicates to retrieve at least one keyword automatically, and the apparatus is further caused to:
generate the personalized lyrics through mapping the at least one keyword to the user's personalized sentences based at least on the personal language model.

18. The apparatus of claim 15, wherein the personalized lyrics are generated further based on a topic-emotion graph, the topic-emotion graph comprising a plurality of topic words and a plurality of emotion words that are associated with each other.

19. The apparatus of claim 15, the computer-executable instructions being further executable by the processor to further cause the apparatus to:
   obtain a first spectrogram when the user is singing a target song;
   obtain a second spectrogram when an original singer of the target song is singing the target song;
   determine differences between the first spectrogram and the second spectrogram; and
   display to the user a response based at least on the differences in the chat flow at the user interface.

20. The apparatus of claim 15, the computer-executable instructions being further executable by the processor to further cause the apparatus to:
   receive a query that is associated with a target song;
   retrieve the target song based on the query through a similarity matching model; and
   display to the user the target song in the chat flow at the user interface.

* * * * *